(12) United States Patent
Lin et al.

(10) Patent No.: US 11,016,363 B2
(45) Date of Patent: May 25, 2021

(54) SELF-STARTING MODE LOCKING SOLITON COMB DEVICE

(71) Applicants: Qiang Lin, Rochester, NY (US); Yang He, Rochester, NY (US)

(72) Inventors: Qiang Lin, Rochester, NY (US); Yang He, Rochester, NY (US)

(73) Assignee: POSPEA, LLC, Rochester, NY (US)

( * ) Notice: Subject to any disclaimer, the term of this patent is extended or adjusted under 35 U.S.C. 154(b) by 0 days.

(21) Appl. No.: 16/720,567

(22) Filed: Dec. 19, 2019

(65) Prior Publication Data

US 2020/0201138 A1 Jun. 25, 2020

Related U.S. Application Data

(60) Provisional application No. 62/781,947, filed on Dec. 19, 2018.

(51) Int. Cl.
*G02F 1/35* (2006.01)
*G02F 1/355* (2006.01)

(52) U.S. Cl.
CPC .......... *G02F 1/3511* (2013.01); *G02F 1/3551* (2013.01); *G02F 2203/17* (2013.01)

(58) Field of Classification Search
CPC .................. G02F 1/3513; G02F 2203/17
See application file for complete search history.

(56) References Cited

U.S. PATENT DOCUMENTS

| 7,982,944 | B2 | 7/2011 | Kippenberg et al. |
| 9,348,194 | B2* | 5/2016 | Herr .................. G02B 6/29338 |
| 10,270,529 | B2* | 4/2019 | Karpov ................ G02F 1/3513 |
| 10,310,186 | B2* | 6/2019 | Grudinin ........... G02B 27/0012 |
| 2019/0296512 | A1* | 9/2019 | Wong .................... G02F 1/3536 |
| 2019/0312402 | A1 | 10/2019 | Lucas et al. |
| 2020/0201138 | A1* | 6/2020 | Lin ....................... G02F 1/3511 |

OTHER PUBLICATIONS

Del'Haye, P., et al., Optical frequency comb generation from a monolithic microresonator, Nature Letters, vol. 450, 20, pp. 1214-1217 with supplementary information pp. 1-9.
Levy, Jacob S., et al., Cmos-compatible multiple-wavelength oscillator for on-chip optical interconnects, Nature Photonics, vol. 4, Jan. 2010, pp. 37-40.
Razzari, L., et al., CMOS-compatible integrated optical hyperparametric oscillator, Nature Photonics, vol. 4, Jan. 2010, pp. 41-45.

(Continued)

*Primary Examiner* — Rhonda S Peace
(74) *Attorney, Agent, or Firm* — Bond, Schoeneck & King, PLLC; Jeffrey B. Powers

(57) ABSTRACT

A self-starting mode locking soliton device includes a first optical port to accept an input coherent light. A second optical port provides an output comb of a plurality of wavelengths. A comb resonator with optical Kerr nonlinearity and anomalous group-velocity dispersion is optically coupled to both of said first optical port and said second optical port. The resonator includes an optical property of a negative nonlinear bistability to enable the self-starting mode locking of a Kerr soliton comb. A method of self-starting mode locking is described. A method of producing the negative nonlinear bistability is also described.

18 Claims, 38 Drawing Sheets

(56) References Cited

OTHER PUBLICATIONS

Savchenkov, A.A., et al., Kerr combs with selectable central frequency, Nature Photonics, Apr. 24, 2011, pp. 1-4.

Liang, W., et al., Generation of near-infrared frequency combs from a MgF2 whispering gallery mode resonator, Optics Letters, vol. 26, No. 12, Jun. 15, 2011, pp. 2290-2292.

Ferdous, Fahmida, et al., Spectral line-by-line pulse shaping of on-chip microresonator frequency combs, Nature Photonics, vol. 5, Dec. 2011, pp. 770-776.

Li, Jiang, et al., Low-Pump-Power, Low-Phase-Noise, and Microwave to Millimeter-Wave Repetition Rate Operation in Vlicrocombs, Physical Review Letters, PRL 109, Dec. 7, 2012, pp.233901-1-233901-5.

Wang, C.Y., et al. Mid-infrared optical frequency combs at 2.5 mm based on crystalline microresonators, Nature Communications 4:1345, published Jan. 9, 2013, pp. 1-7.

Jung, Hojoong, et al., Optical frequency comb generation from aluminum nitride resonator, Optics Letters, vol. 38, No. 15, Optics Letters vol. 38, No. 15, Aug. 1, 2013, pp. 2810-2813.

Hausmann, B.J.M., et al., Diamond nonlinear photonics, Nature Photonics, vol. 8, May 2014 (published on-line Apr. 20, 2014), pp. 369-374.

Papp, Scott B., et al., Microresonator frequency comb optical clock, Optica, vol. 1, No. 1, Jul. 2014, pp. 10-14.

Jung, Hojoong, et al., Green, red, and IR frequency comb line generation from single IR pump in AIN microring resonator, Optica, vol. 1, No. 6, Dec. 2014, pp. 396-399.

Griffith, Austin G., Silicon-chip mid-infrared frequency comb generation, Nature Communications 6:6299, published Feb. 24, 2015, pp. 1-5.

Yi, Xu, et al., Soliton frequency comb at microwave rates in a high-Q silica microresonator, Optica, vol. 2, No. 12, Dec. 2015, pp. 1078-1085.

Joshi, Chaitanya, et al., Thermally controlled comb generation and soliton modelocking in microresonators, Optics Letters, vol. 41, No. 11, Jun. 1, 2016, pp. 2565-2568.

Karpov, Maxim, et al., Raman Self-Frequency Shift of Dissipative Kerr Solitons in an Optical Microresonator, Physical Review Letters, PRL 116, Mar. 11, 2016, pp. 103902-1-103902-5, and Supplementary Material pp. 1-5.

Pu, Minhao, et al., Efficient frequency comb generation in AlGaAs-on-insulator, Optica, vol. 3, No. 8, Aug. 2016, pp. 323-826.

Yang, Qi-Fan, et al., Stokes solitons in optical microcavities, Nature Physics, vol. 13, Jan. 2017 (published on-line Mar. 15, 2016), pp. 53-58.

Suh, Myoung-Guyn, et al., Microresonator soliton dual-comb spectroscopy, Reports, vol. 354, Issue 6312, Nov. 1, 2016, sciencemag.org, pp. 600-603.

Li, Qing, et al. Stably accessing octave-spanning microresonator frequency combs in the soliton regime, Optica, vol. 1, No. 2, Feb. 2017, pp. 193-203.

Marin-Palomo, Pablo, et al., Microresonator-based solitons for massively parallel coherent optical communications, Nature, vol. 546, Jun. 8, 2017, pp. 274-279.

Cole, Daniel C., et al., Soliton crystals in Kerr resonators, Nature Photonics, vol. 11, Oct. 2017, pp. 671-676.

Suo, Hairun, et al., Intermode Breather Solitons in Optical Microresonators, Physical Review (2017), 2160-3308/17/7(4), pp. 041055-1-041055-10.

Suh, Myoung-Gyun, et al., Soliton microcomb range measurement, Science 359, 884-887, Feb. 23, 2018, pp. 1-4.

Trocha, P., et al., Ultrafast optical ranging using microresonator soliton frequency combs, Science 359, 887-891, Feb. 23, 2018, pp. 1-5.

Dutt, Avik, et al., On-chip dual-comb source for spectroscopy, Science Advances, 2018; 4;e1701858, Mar. 2, 2018, pp. 1-9.

Spencer, Daryl T., et al., An optical-frequency synthesizer using integrated photonics, Nature, https://doi.org/10.1038/541586-018-0065-7, 2018, 8 pages.

Kippenberg, Tobias J., et al., Dissipative Kerr solitons in optical microresonators, Review Summary and Research Review, Science 361, eaan8083, Aug. 10, 2018, pp.1-11.

Coen, Stephane, et al., Universal scaling laws of Kerr frequency combs, Optics Letters, vol. 38, No. 11, Jun. 1, 2013, pp. 1790-1792.

Carmon, Tal, et al., Dynamical thermal behavior and thermal selfstability of microcavities, Optics Express, vol. 12, No. 20, Oct. 4, 2004, pp. 4742-4750.

Guo, H., et al., Universal dynamics and deterministic switching of dissipative Kerr solitons in optical microresonators, Nature Physics, vol. 13, Jan. 2017, pp. 94-102 and Supplementary Information pp. 1-6.

Herr, T., et al., Temporal solitons in optical microresonators, Nature Photonics, vol. 8, Feb. 2014 (published online Dec. 22, 2013), pp. 145-152 with Supplementary Information pp. 1-12.

\* cited by examiner

SELF-STARTING MODE LOCKING SOLITON COMB DEVICE

RELATED APPLICATION

The present application claims the benefit of U.S. Provisional Application No. 62/781,947 filed on Dec. 19, 2018 having a title SELF-STARTING MODE LOCKING SOLITON COMB DEVICE under 35 U.S.C. § 119(e), the substance of said application is hereby incorporated by reference in its entirety.

STATEMENT REGARDING FEDERALLY FUNDED RESEARCH OR DEVELOPMENT

This invention was made with government support Grant Nos. HDTRA11810047, ECCS-1810169, EFMA-1641099, and ECCS-1842691 awarded by the Defense Threat Reduction Agency (DTRA) and the National Science Foundation (NSF). The government has certain rights in the invention.

FIELD OF THE APPLICATION

The application relates to optical combs and particularly to a mode locking soliton comb device.

BACKGROUND

In the background, other than the bolded paragraph numbers, non-bolded square brackets ("[ ]") refer to the citations listed hereinbelow.

On-chip generation of optical frequency combs via the optical Kerr nonlinearity has attracted significant interest in recent years [1-29]. Kerr frequency combs exhibit great potential for broad applications such as frequency metrology [12], optical frequency synthesis [28], precision spectroscopy [20, 27], photonic signal processing [6], optical communication [22], to name a few. For a majority of these applications, mode locking of Kerr frequency comb to form a cavity soliton [10, 29] is crucial, in which all the comb lines are locked with each other in their phase, forming a coherent pulse train in the time domain.

Unfortunately, accessing to the soliton regime of Kerr comb is not trivial, due to its unique requirement of nonlinear properties inside the cavity [10, 30]. This particularly becomes very challenging in practice since the devices inevitably exhibit strong thermo-optic nonlinear effects [31] which severely interfere with the soliton generation process [10, 32], making it extremely challenging to access to the soliton regime. Accessing to the soliton regime requires sophisticated power managing and frequency tuning procedure [10, 15, 16, 21]. Even with this procedure, the device can only stay in the soliton regime for a limited period of time [10, 15, 16, 21]. To date, there is not any Kerr comb device which is able to self-start in the soliton regime, an obstacle for the practical application of a Kerr frequency comb.

SUMMARY

According to one aspect, a mode locking soliton device includes a first optical port to accept an input coherent light. A second optical port provides an output comb of a plurality of wavelengths. A comb resonator $3^{rd}$ party—your own is optically coupled to both of said first optical port and said second optical port. The comb resonator includes an optical property of a negative nonlinear bistability.

In one embodiment, in response to the input coherent light, the output comb of the plurality of wavelengths is self-starting.

In another embodiment, the mode locking soliton device includes a self-starting mode locking soliton microcomb device.

In yet another embodiment, the resonator includes a ring resonator.

In yet another embodiment, the ring resonator is coupled to an optical waveguide, and either end of the optical waveguide provides the first optical port and the second optical port.

In yet another embodiment, the input coherent light includes a laser light.

In yet another embodiment, the resonator includes a planar resonator of an integrated optical structure.

In yet another embodiment, the resonator includes a z-cut lithium niobate (LN) resonator.

In yet another embodiment, the resonator includes a material selected from: lithium niobate (LiNbO3), lithium tantalate (LiTaO3), potassium niobate (KNbO3), gallium arsenide (GaAs), or indium phosphide (InP).

In yet another embodiment, the resonator includes a material selected from: BBO, LBO, LYF, or CaF2.

In yet another embodiment, the optical property of the negative nonlinear bistability is based on a pyroelectric and electro-optic effect property of a material.

In yet another embodiment, the optical property of the negative nonlinear bistability is based on a negative thermo-optic coefficient property of a material.

In yet another embodiment, the optical property of the negative nonlinear bistability is based on a negative thermal expansion coefficient property of a material.

In yet another embodiment, the optical property of the negative nonlinear bistability is based on a combination of at least two optical properties of materials selected from: pyroelectric and electro-optic effect, negative thermo-optic coefficient, and negative thermal expansion coefficient.

In yet another embodiment, the optical property of the negative nonlinear bistability is based on a type of material wafer cut.

According to another aspect, a method producing a comb of a plurality of wavelengths includes: providing a mode locking soliton device including a first optical port, a second optical port, and a comb resonator with optical Kerr nonlinearity and anomalous group-velocity dispersion optically coupled to both of the first optical port and the second optical port, the resonator including an optical property of a negative nonlinear bistability; illuminating the first optical port by a source of coherent light to self-start mode locking of the resonator; and generating a coherent output comb of the plurality of wavelengths as output light from the second optical port.

In one embodiment, the step of illuminating includes illuminating the first optical port by the source of coherent light to self-start mode locking of the resonator in a single-soliton state.

In another embodiment, the step of illuminating includes illuminating the first optical port by the source of coherent light to self-start mode locking of the resonator in a multi-soliton or a soliton-crystal state.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 4I is a graph showing the measured comb spectrum of the single-soliton state;

FIG. 8I is an optical image of the device, corresponding to FIGS. 8G and 8H;

All figures are part of the description of the Application.

DETAILED DESCRIPTION

In the description, other than the bolded paragraph numbers, non-bolded square brackets ("[ ]") refer to the citations listed herein below.

The device and method of self-starting mode locking soliton microcomb devices according to the Application is described in four parts. Part 1 describes challenges in accessing the soliton regime, part 2 describes a new self-starting soliton microcomb method according to the Application, part 3 describes an exemplary self-starting soliton microcomb device, and part 4 describes exemplary materials for a self-starting soliton microcomb device.

Part 1—The Challenge in Accessing the Soliton Regime

Figure 1:
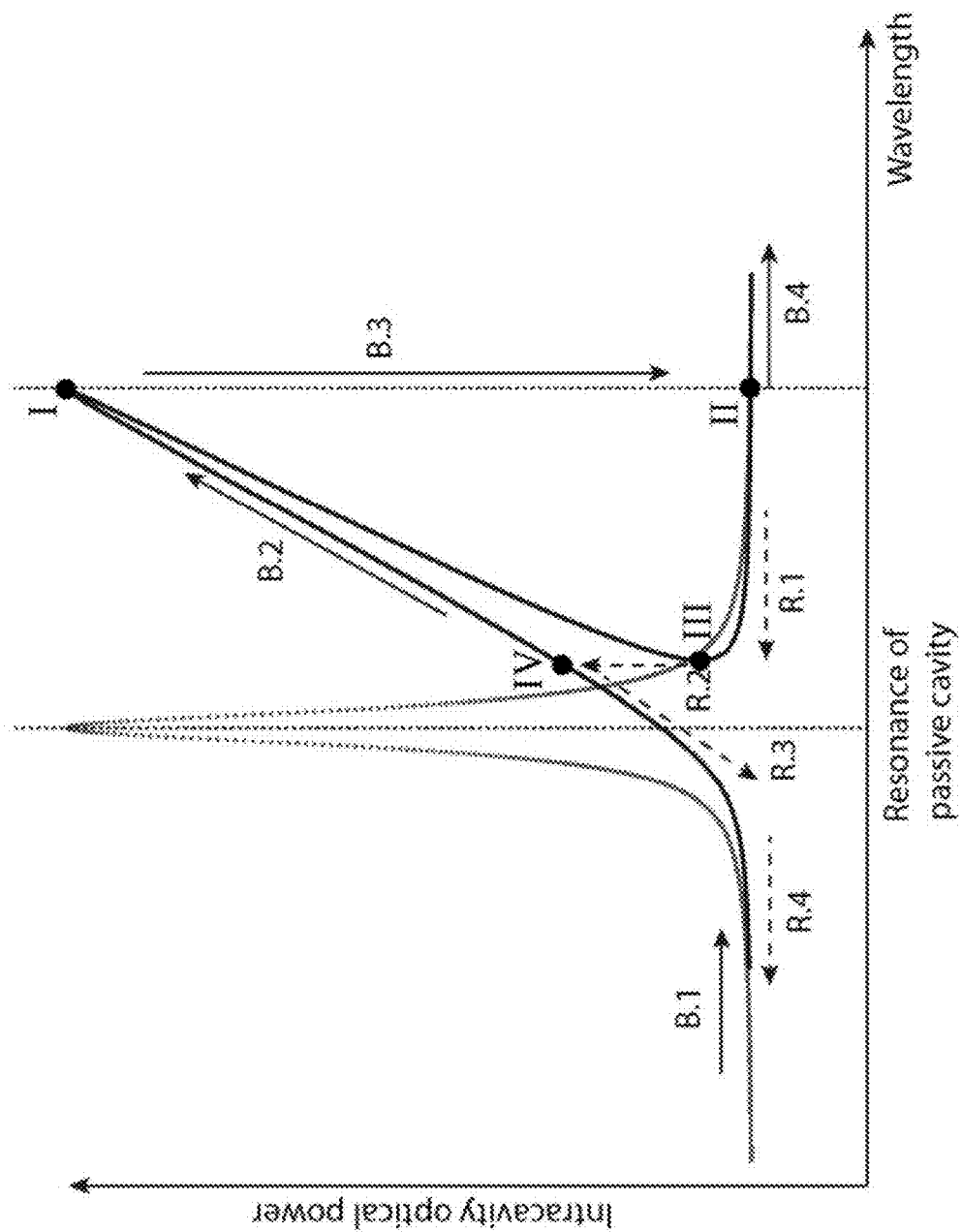
FIG. 1 shows a graph illustrating the impact of optical Kerr effect on a cavity resonance, when the optical power is launched into the resonator.

FIG. 1 shows a graph illustrating the impact of optical Kerr effect on a cavity resonance, when the optical power is launched into the resonator. The black dashed curve shows the resonance of the passive cavity in the absence of the optical power. The black solid curve shows the cavity resonance shape under the optical Kerr effect. The Kerr-nonlinearity induced self-phase modulation shifts the resonance towards red (longer wavelength). The solid-line arrows show the case when the laser wavelength is tuned towards red, from the blue-detuned side of the cavity resonance. The dash-line arrows show the case when the laser wavelength is tuned towards blue, from the red-detuned side of the cavity resonance.

FIG. 1 shows the challenge in accessing the soliton regime in current devices, including the significant distinction when laser wavelength approaches a high-Q cavity resonance from different directions. Optical power launched into a high-Q microresonator introduces significant self-phase modulation due to the optical Kerr effect. The optical Kerr effect increases the refractive index and thus shifts the cavity resonance towards red (longer wavelength). This effect manifests as a nonlinearity-induced bistability curve as a function of laser-cavity frequency detuning, as shown in the black solid curve of FIG. 1. As a result, when the laser wavelength approaches the cavity resonance from blue-detuned side of the cavity resonance (FIG. 1, Arrow B.1), the increased optical power (equivalently, optical energy) inside the cavity shifts the cavity resonance towards red. The deeper the laser wavelength is tuned into the resonance, the higher the intracavity optical power, and the farther the red shift of the cavity resonance (FIG. 1, Arrow B.2). Until at a certain laser wavelength (when the laser wavelength coincides exactly with the red-shifted cavity resonance) (FIG. 1, Point I), the intracavity optical power cannot increase further. Further red tuning of the laser wavelength will instead decrease the intracavity power, leading to a blue-shifted relaxation of the cavity resonance back to its original position (black dashed curve) in the absence of power. Consequently, the intracavity power drops suddenly to nearly zero (FIG. 1, Arrow B.3 and Point III) and the laser becomes located at far red with respect to the cavity resonance.

The situation becomes very different when the laser wavelength approaches the cavity resonance from the red detuned side (FIG. 1, Arrow R.1). In this case, the increased optical power inside the cavity causes a red shift of the cavity resonance. At a certain laser-cavity wavelength detuning (FIG. 1, Point III), the intracavity power becomes significant enough to shift the cavity resonance to the red side of the laser wavelength. Consequently, the intracavity power will jump directly from Point III to Point IV (FIG. 1, Arrow R.2), resulting in the laser wavelength located at the blue-detuned side of the cavity resonance (FIG. 1, Point IV). Further blue tuning of the laser wavelength will decrease the intracavity power (FIG. 1, Arrow R.3), leading to blue shifting of the cavity resonance, until the laser wavelength tunes far blue to the cavity resonance, where the intracavity power becomes negligible and the cavity resonance relaxes back to its original position (black dashed curve).

The discussions above show that, to produce a high intracavity optical power (FIG. 1, Point I) with an intracavity optical energy high enough for soliton formation, the laser wavelength has to approach the cavity resonance from the blue detuned side and then is tuned deep into the cavity resonance.

Figure 2A:
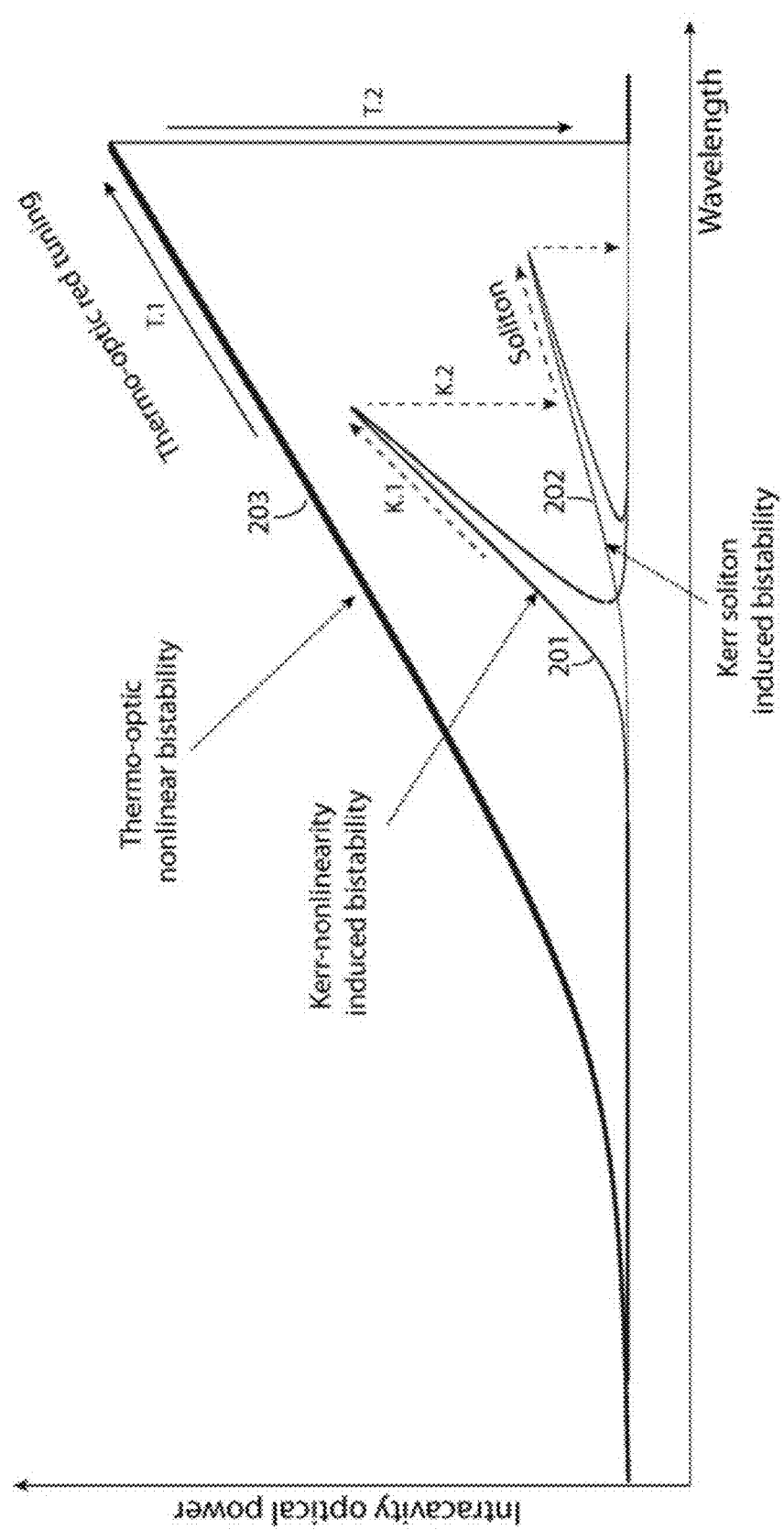
FIG. 2A is a graph illustrating accessing the soliton regime in current devices in the presence of Kerr-nonlinearity induced bistability and thermo-optic nonlinear bistability in a microresonator.
Figure 2B:
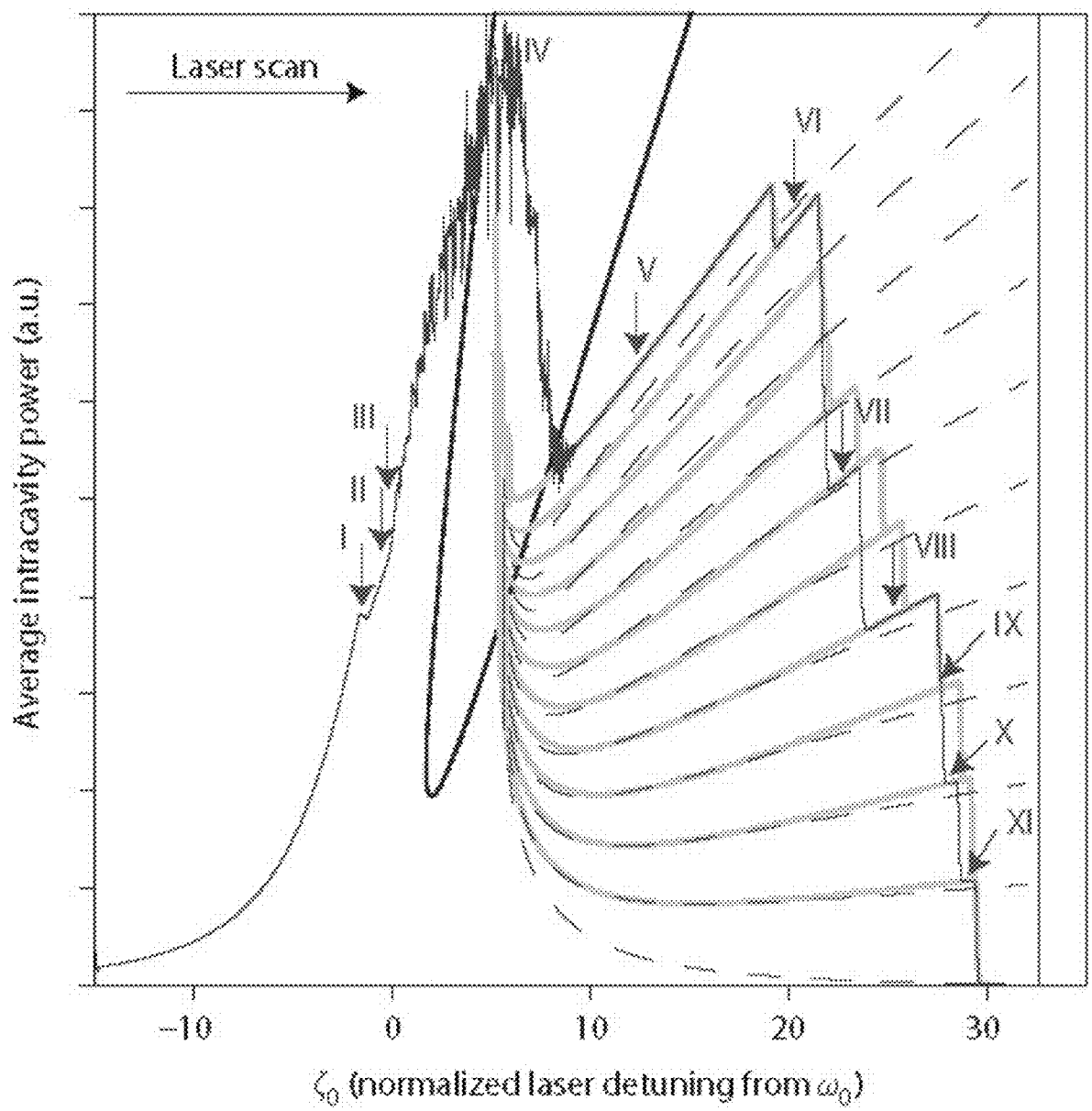
FIG. 2B is a graph illustrating the comb power dynamics inside a resonator when tuning the pump laser frequency across the cavity resonance, from Ref [10]
Figure 2C:
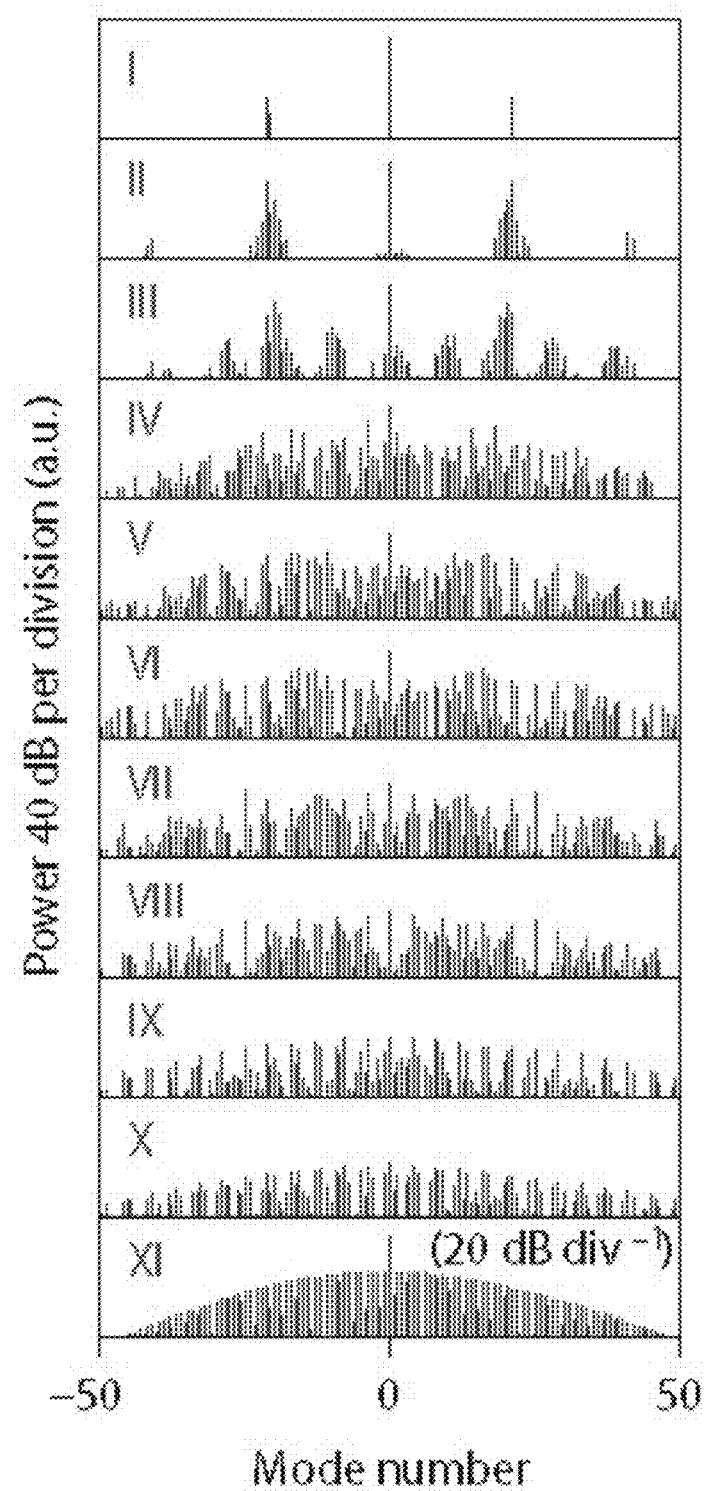
FIG. 2C is a graph illustrating the comb spectra at different laser-cavity frequency detuning regions as indicated in FIG. 2B, from Ref [10]
Figure 2D:
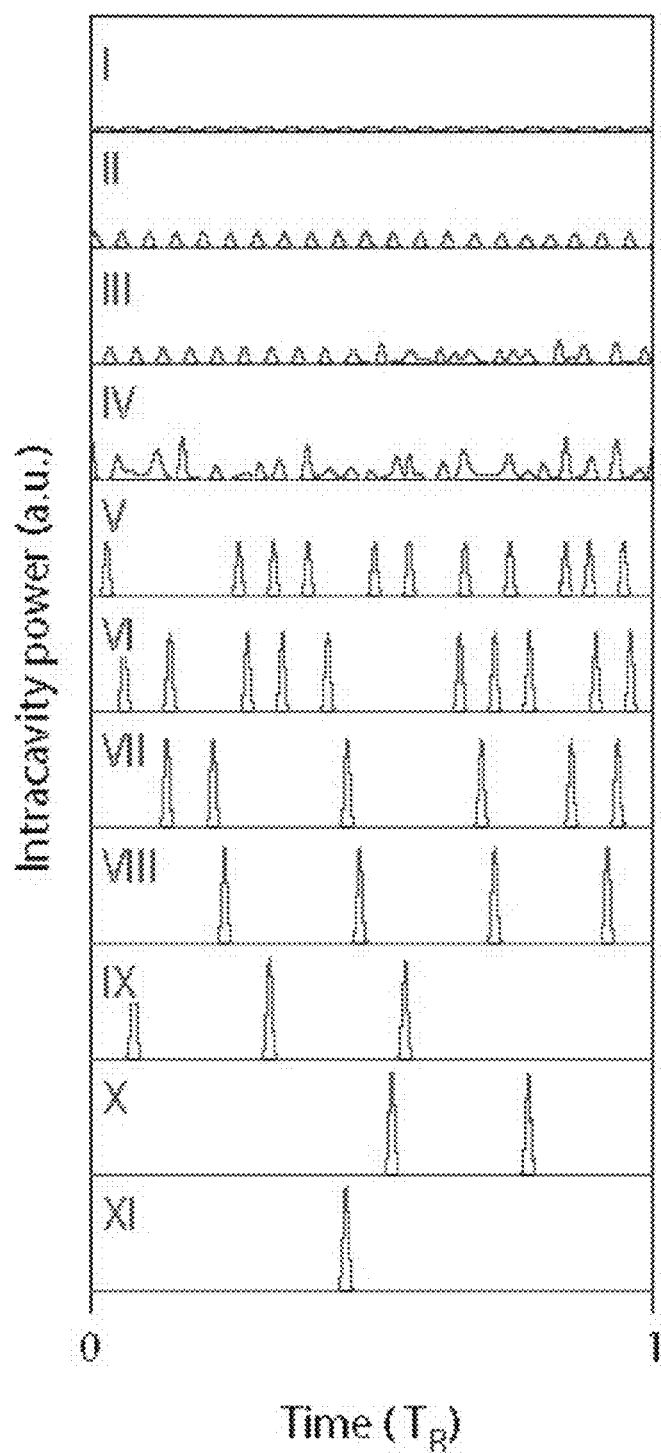
FIG. 2D is a graph illustrating the temporal waveforms of the comb corresponding to FIG. 2B, from Ref [10]

The situation becomes more complicated during the Kerr comb generation, since the Kerr comb is generally produced with a continuous-wave (CW) laser. FIG. 2A is a graph illustrating accessing the soliton regime in current devices in the presence of Kerr-nonlinear bistability (201) and thermo-optic nonlinear bistability (203) in a microresonator. FIGS. 2B, 2C, and 2D are graphs illustrating the evolution dynamics of Kerr frequency combs when tuning the pump laser frequency [10].

Unfortunately, the Kerr-nonlinearity induced bistability curves are very different for the CW pump laser (201) and for soliton (202), as show in FIG. 2A, due to the significant power difference inside the cavity [10, 30]. Consequently, accessing the soliton regime requires the laser wavelength to tune across the cavity resonance (FIG. 2A, Arrow K.1 to K.2), passing through different nonlinear regimes until the last step arriving at the useful single soliton regime. FIGS. 2B, 2C, and 2D show this process more clearly. To tune into the single-soliton state (FIG. 2B, Point XI, and FIGS. 2C and 2D, XI), the pump laser frequency has to be tuned from Point I, across a complicated processes, till the last step ending at the single-soliton state [10]. That is, the Kerr soliton mode locking cannot start by itself. Rather in this situation, Kerr soliton mode locking requires an external sophisticated procedure to force the Kerr comb to be mode locked.

In practice, high-Q microresonators exhibit significant thermo-optic nonlinearity. As the increased optical power inside the cavity increases, the temperature of the device (due to material absorption) in turn increases the effective refractive index of the cavity mode (because the overall thermo-optic effect is generally positive) and thus red shifts the cavity resonance wavelength (FIG. 2A, Arrow T.1), resulting in a thermo-optic nonlinear bistability curve (FIG. 2A, 203) [31] similar to the Kerr-nonlinear induced one but with a much larger magnitude. As a result, the laser-cavity detuning required for the soliton formation becomes located at a deep thermo-optic unstable regime [10, 32]. Accessing to the soliton regime requires sophisticated sequential manipulation of laser power and wavelength [10, 15, 16, 21]. Moreover, even after the device falls in the soliton regime, any thermal fluctuations or mechanical perturbation to the device will kick the device out of this regime, since the soliton regime is thermo-optically unstable.

Part 2—Self-Starting Soliton Microcomb Method

A new approach for self-starting soliton microcomb according to the Application is now described. The feasibility of this approach has been experimentally proved in our lab, as described in more detail herein below.

Figure 3A:
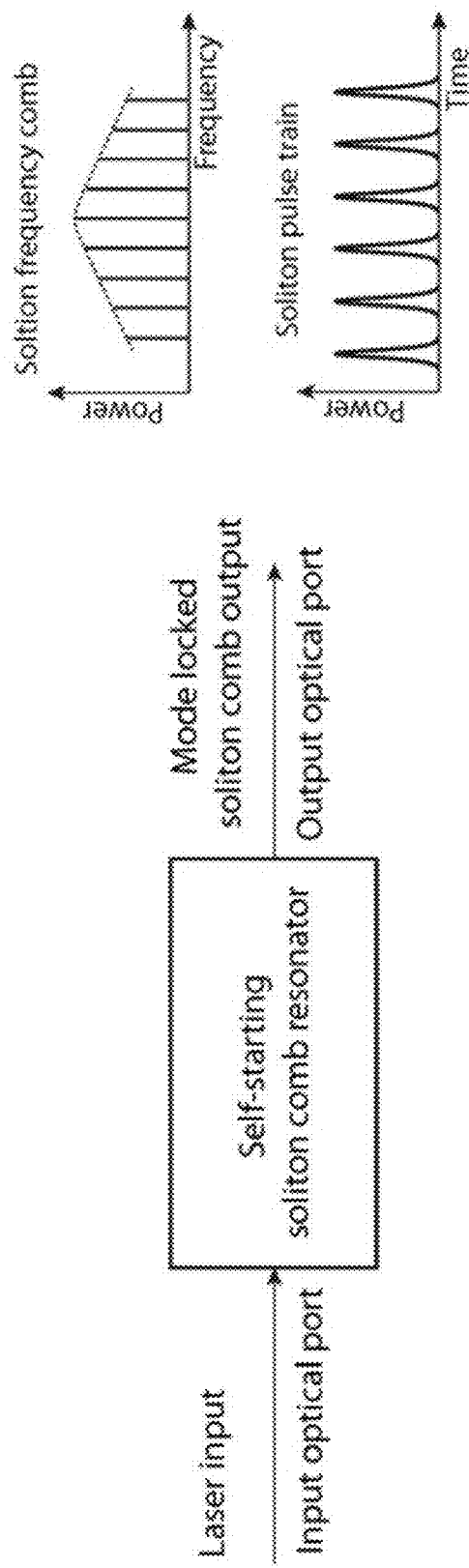
FIG. 3A is a graph illustrating the self-starting soliton comb device according to the Application.

FIG. 3A is a graph illustrating the self-starting soliton comb device of the Application. When a laser is launched into the self-starting soliton comb resonator, the microcomb will start by itself into the soliton mode locking regime, directly resulting in a coherent mode locked soliton comb output from the resonator.

Figure 3B:
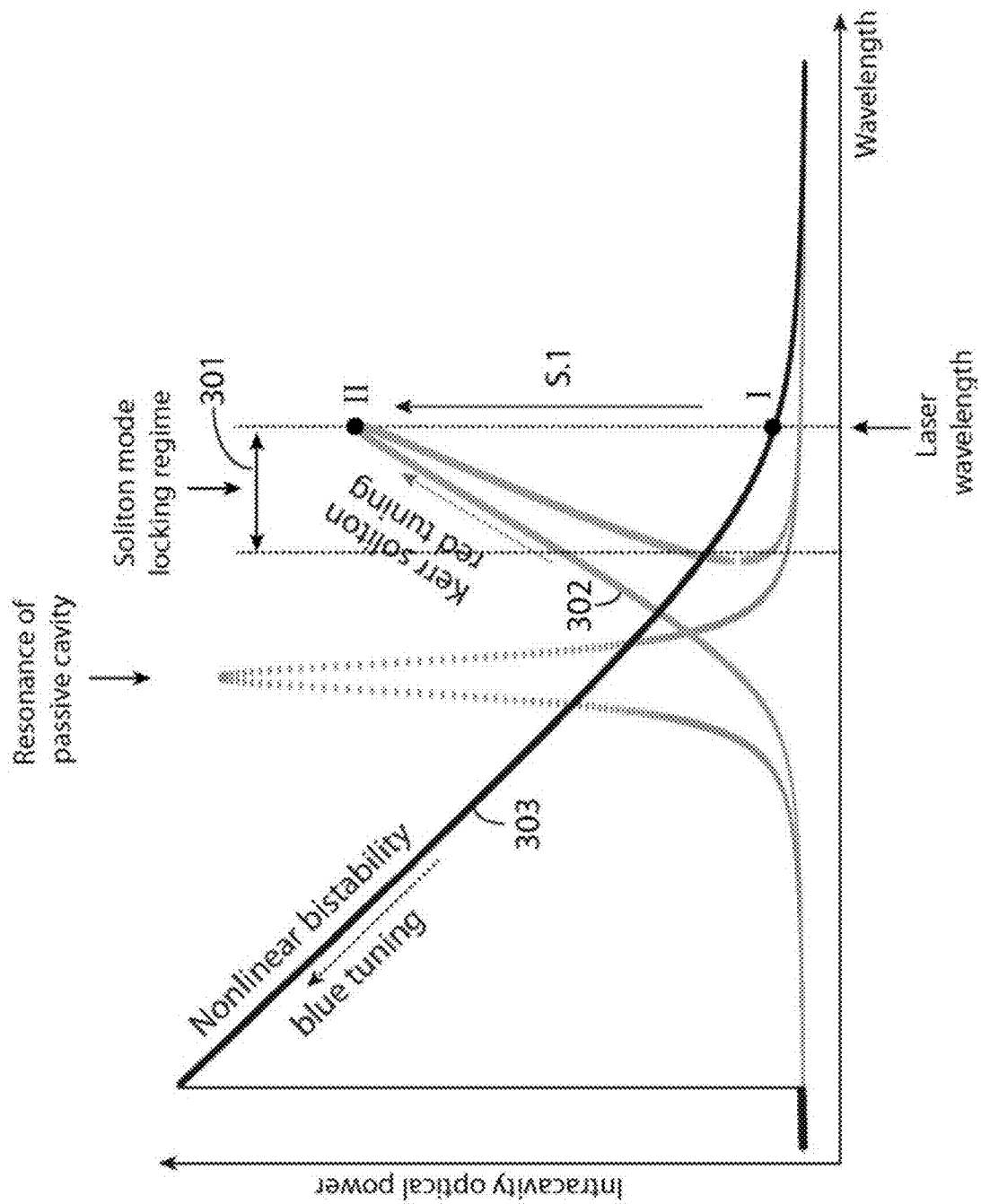
FIG. 3B is a graph illustrating the self-starting mechanism of soliton mode locking of the device and method according to the Application.

FIG. 3B is a graph which illustrates the self-starting mechanism of soliton mode locking of the Application, where a negative nonlinear bistability (303) helps to stabilize the laser-cavity detuning at the red-detuned side directly corresponding to the soliton generation regime (301). To initiate the self-starting of mode locking, as schematically shown in FIG. 3B, we introduce a negative nonlinear bistability (303). The negative nonlinear bistability is in addition to and opposite to the bistability induced by the optical Kerr-nonlinearity (302, and 201 of FIG. 2A) present in the cavity. If the overall nonlinear bistability of the device is negative, the cavity resonance will shift towards blue (instead of red) when the optical power increases inside the cavity. Such a negative nonlinear bistability has the following effects:

First, the negative nonlinear bistability produces a self-locking mechanism to stabilize the laser-cavity detuning at the red-detuned side (For example, FIG. 3B, Point I). As a result, the red-detuned laser can launch stable power into the cavity, with a stable laser-cavity red detuning;

Second, the blue-shifting of negative nonlinear bistability potentially compensates the red-shifting of the Kerr-nonlinearity induced bistability introduced by the CW pump wave, resulting in a decreased overall bistability, making the device more stable under the nonlinear effects;

Third, and importantly, the red-detuned side of the cavity resonance corresponds directly to the soliton regime (FIG. 3B, 301). As a result, Kerr frequency bomb generation in this regime falls directly into the mode locked soliton regime (FIG. 3B, 301. See also FIG. 4B); and Fourth, the self-locking of laser-cavity detuning helps to stabilize the soliton comb generation, making the soliton comb generation resilient to thermal fluctuations and external mechanical perturbations.

As a result, tuning the laser wavelength into an appropriate red-detuned side of the cavity resonance (FIG. 3B) will immediately self-start the mode locking of Kerr solitons, and the new device will operate stably with time.

In practice, the described negative nonlinear bistability can be realized via a variety of mechanisms, such as, for example, negative thermo-optic refraction, negative thermal expansion, photorefractive effect, etc. As long as the nonlinear bistability shifts the cavity resonance towards blue, it will always work.

Part 3—Self-Starting Soliton Microcomb Device

Figure 4A:
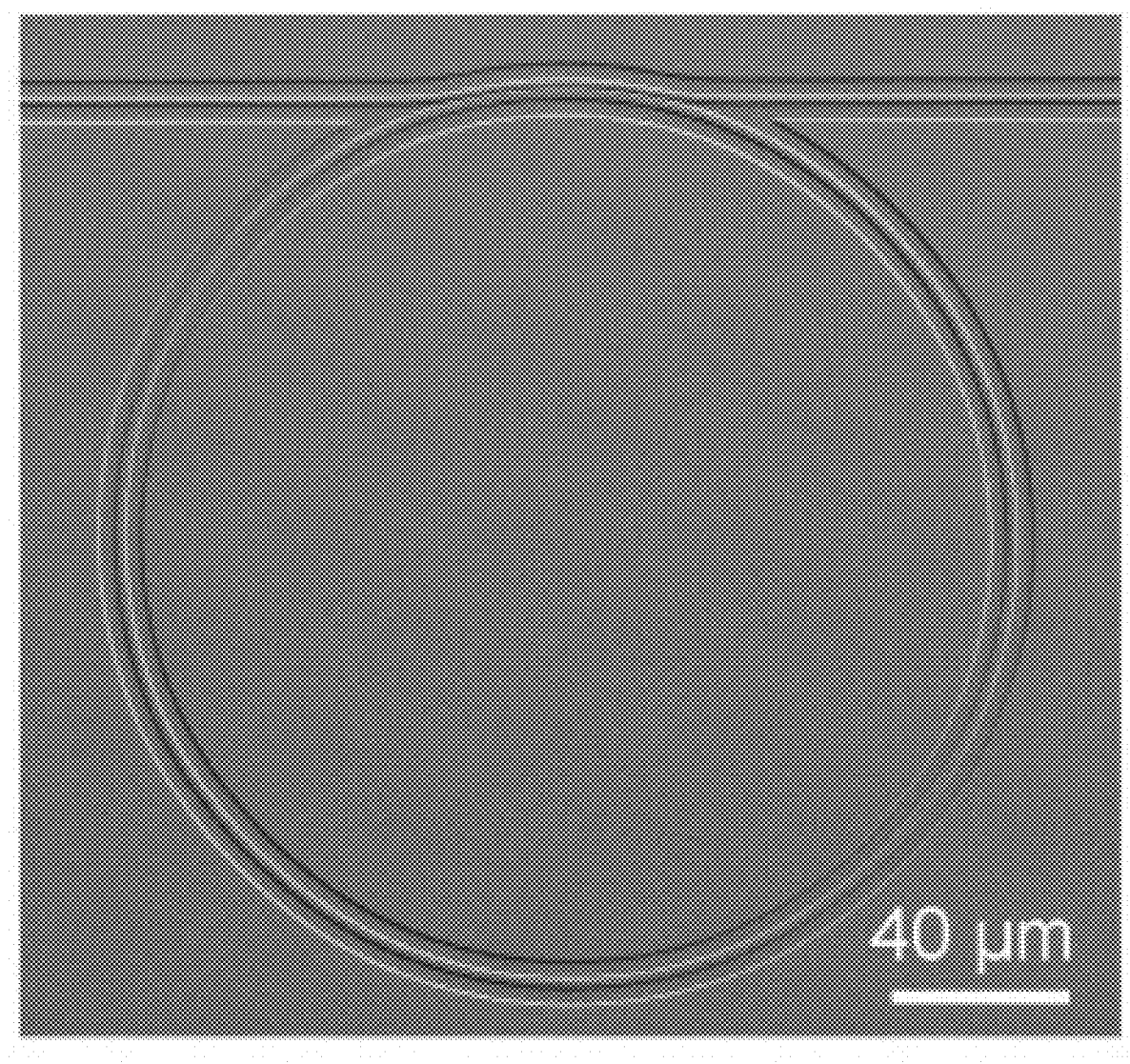
FIG. 4A is a graph showing the fabricated z-cut lithium niobate microring resonator.
Figure 4B:
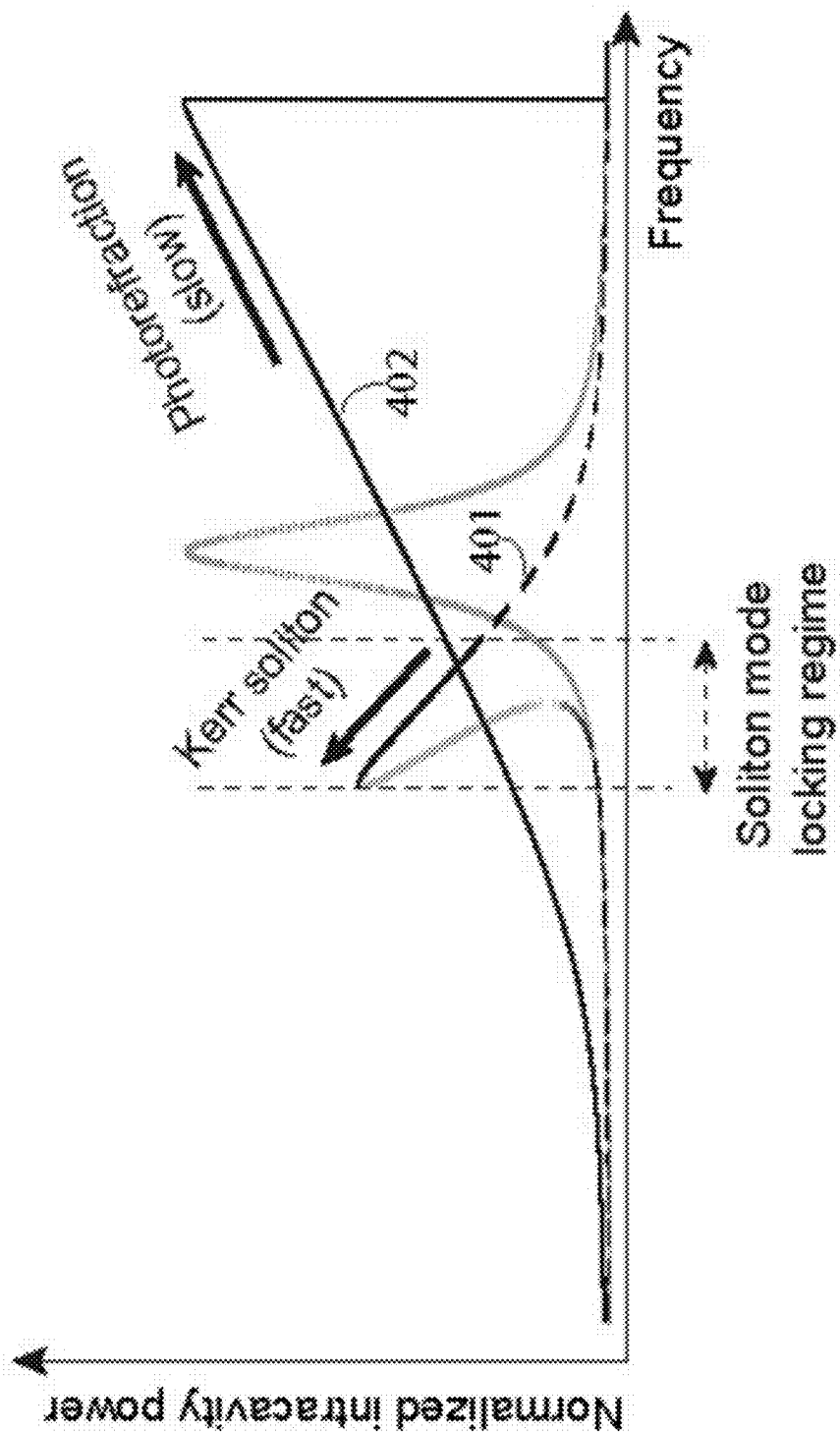
FIG. 4B is a graph illustrating the resonance blue tuning induced by the photorefractive effect (402) and the red tuning induced by the Kerr soliton (401)
Figure 4C:
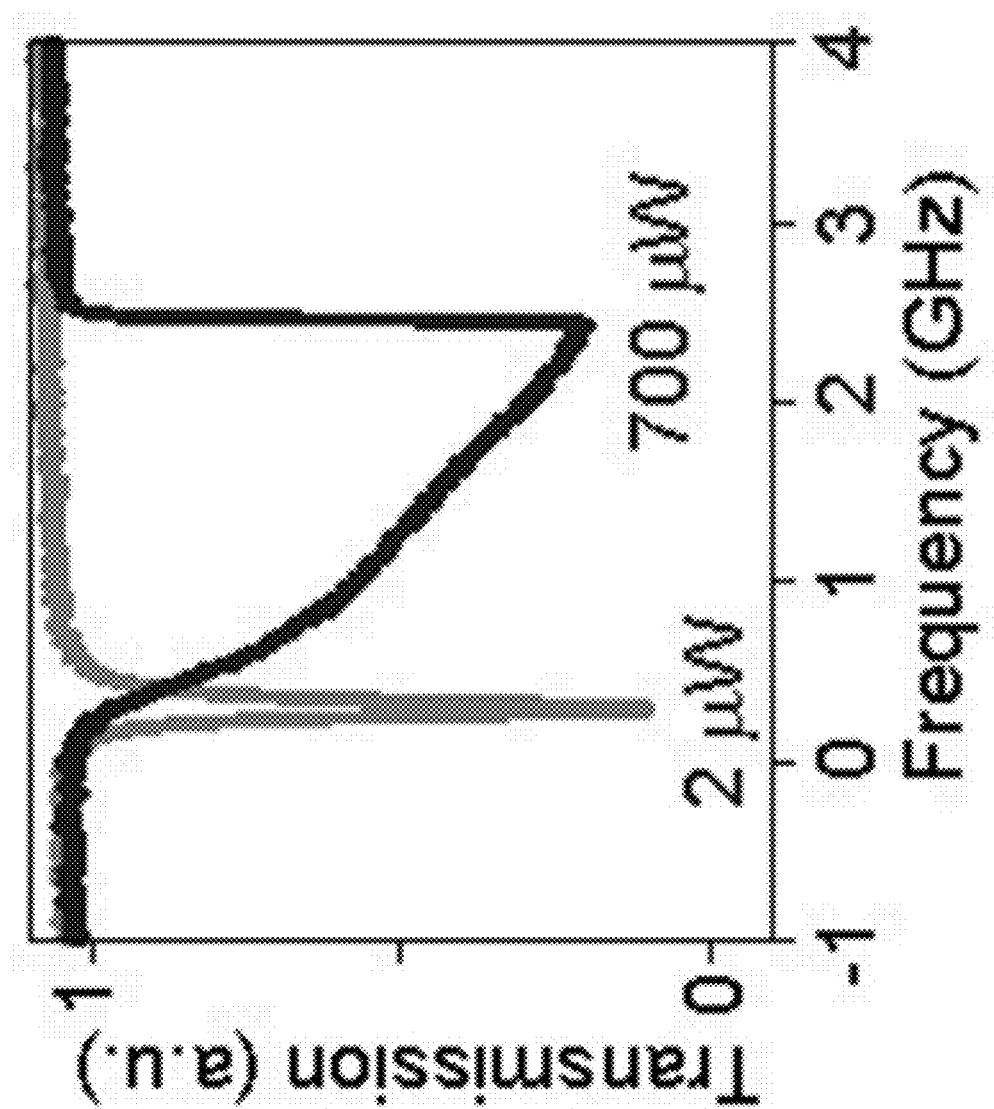
FIG. 4C is a graph showing the measured power transmission versus pump frequency tuning (from red to blue) for a quasi-TE cavity mode at two pump powers.

Laboratory test devices have been implemented in high-Q lithium niobate (LN) microresonators (FIG. 4A). LN exhibits anisotropic thermo-optic coefficients, which is nearly zero at room temperature for ordinary polarized light. In particular, LN exhibits a strong photorefractive effect, which blue shifts the cavity resonance with increased optical power (FIG. 4B, 402). Therefore, if we make devices on a Z-cut LN wafer and use the quasi-TE polarized cavity modes for Kerr comb generation (FIG. 5B), the overall nonlinear bistability becomes negative. That is, the cavity resonance shifts towards blue with increased optical power (FIG. 4B). One example is provided in FIG. 4C, where, at the higher power level, the resonance features a triangular shape versus pump frequency that faces towards higher frequency. This photorefractive-induced behavior stabilizes the laser-cavity detuning when the pump is red-detuned where the soliton is formed (FIG. 4B) and enables the soliton mode locking process to self-start. As a result, the Kerr comb can self-start into the soliton regime.

Figure 4D:
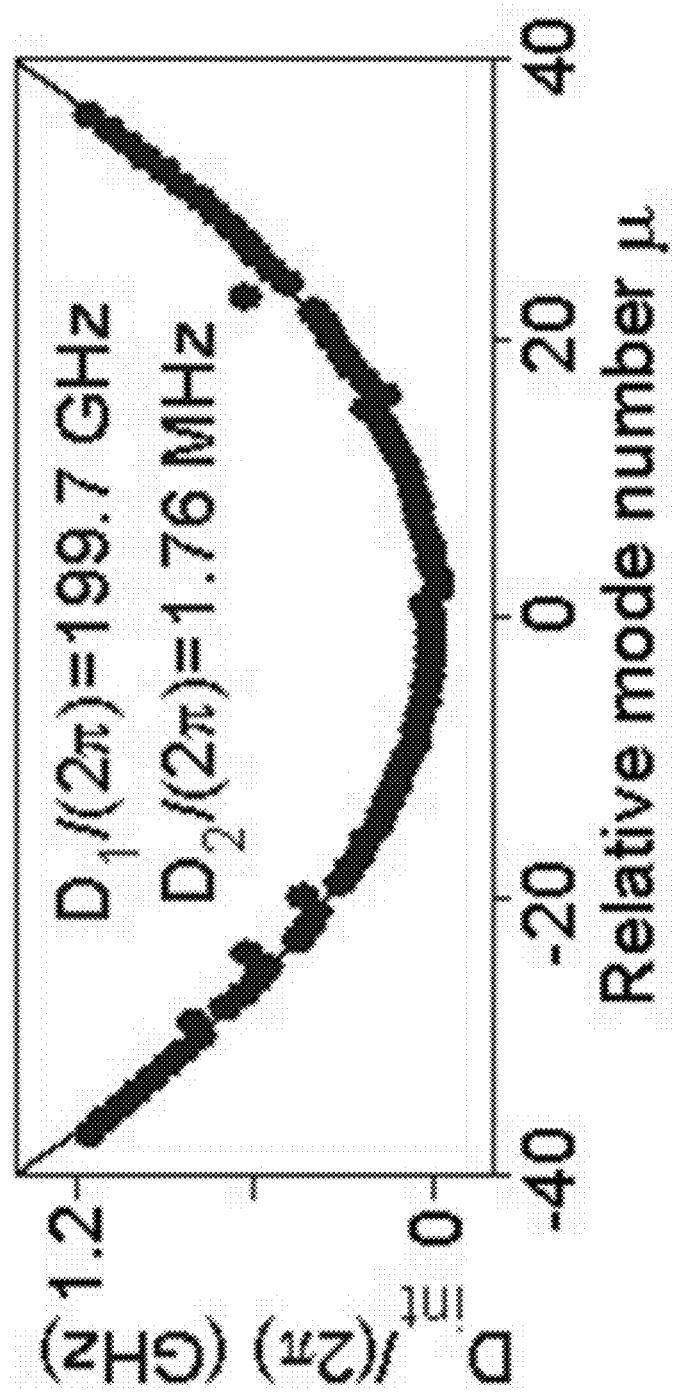
FIG. 4D is a graph showing the measured dispersion property of the lithium niobate microring resonator.
Figure 5A:
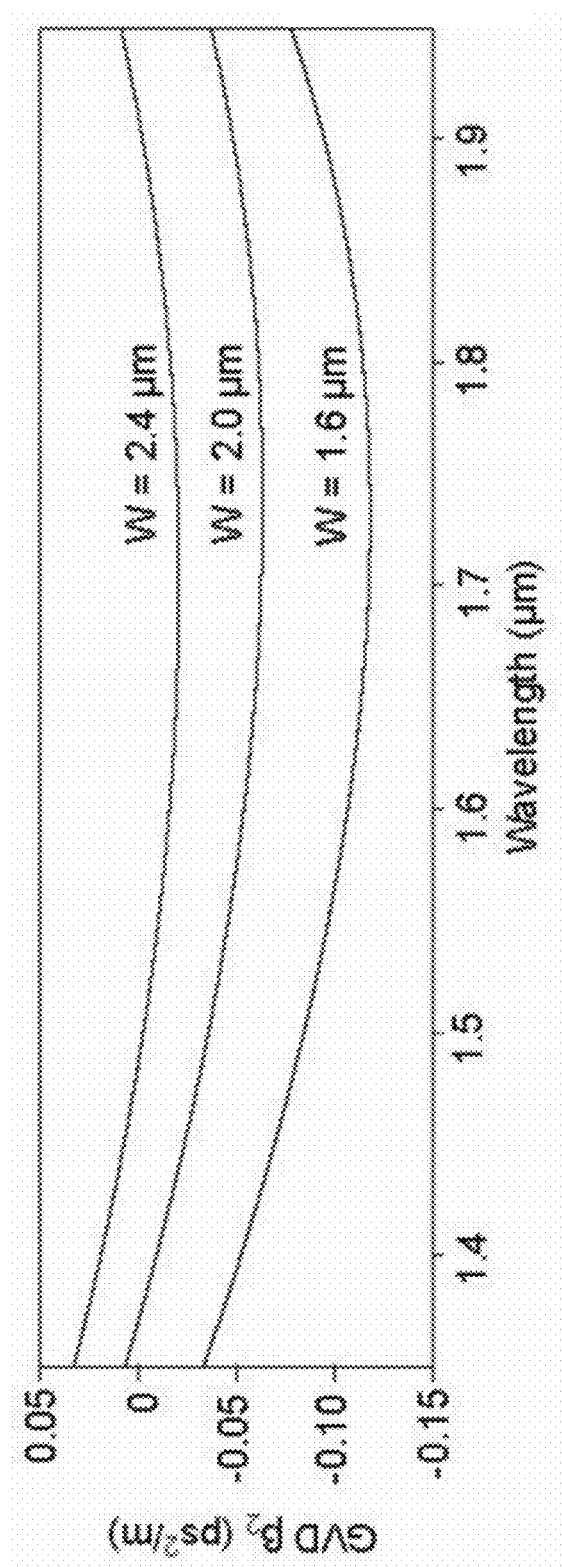
FIG. 5A is a graph showing the numerically simulated group-velocity dispersion (GVD) of the lithium niobate microring resonator with different waveguide widths (W)
Figure 5B:
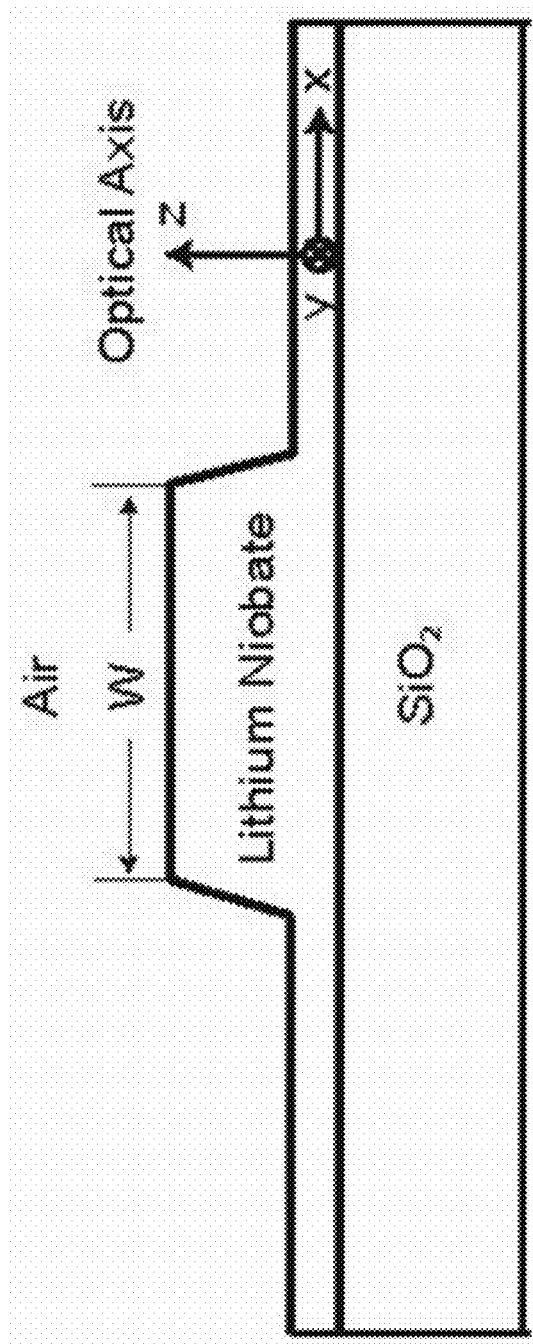
FIG. 5B is a graph illustrating the waveguide cross-section of the z-cut lithium niobate microring resonator.
Figure 5C:
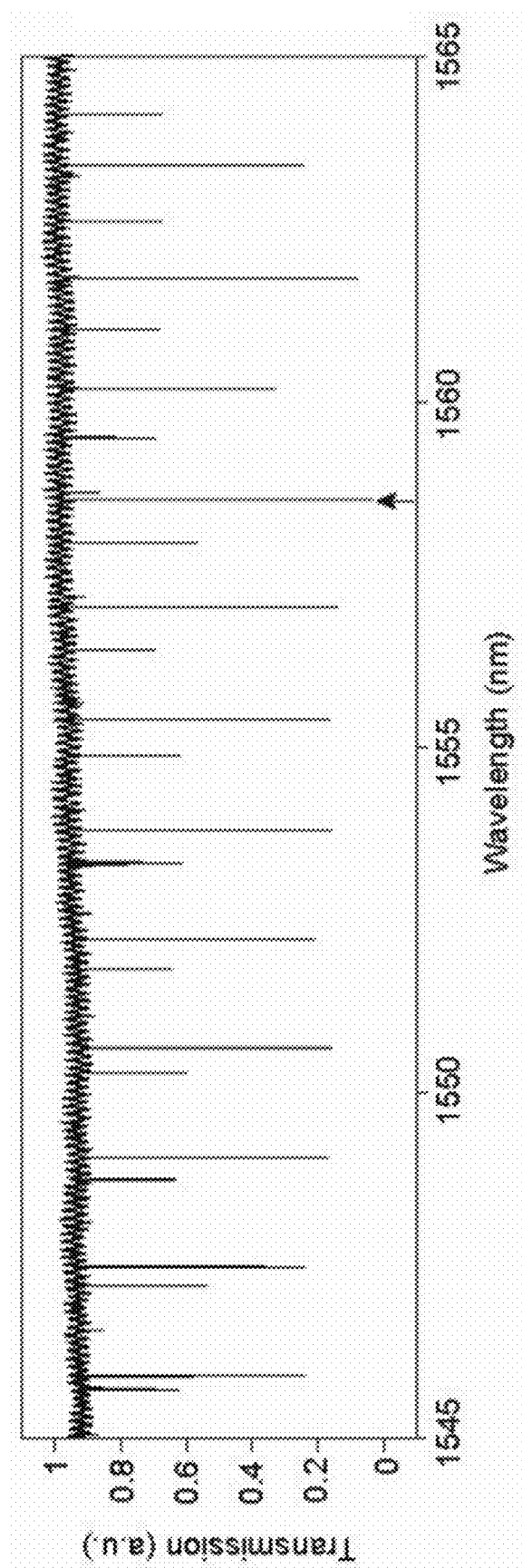
FIG. 5C is a graph showing the measured resonator transmission spectrum in the telecom band, for the quasi-TE polarization.
Figure 5D:
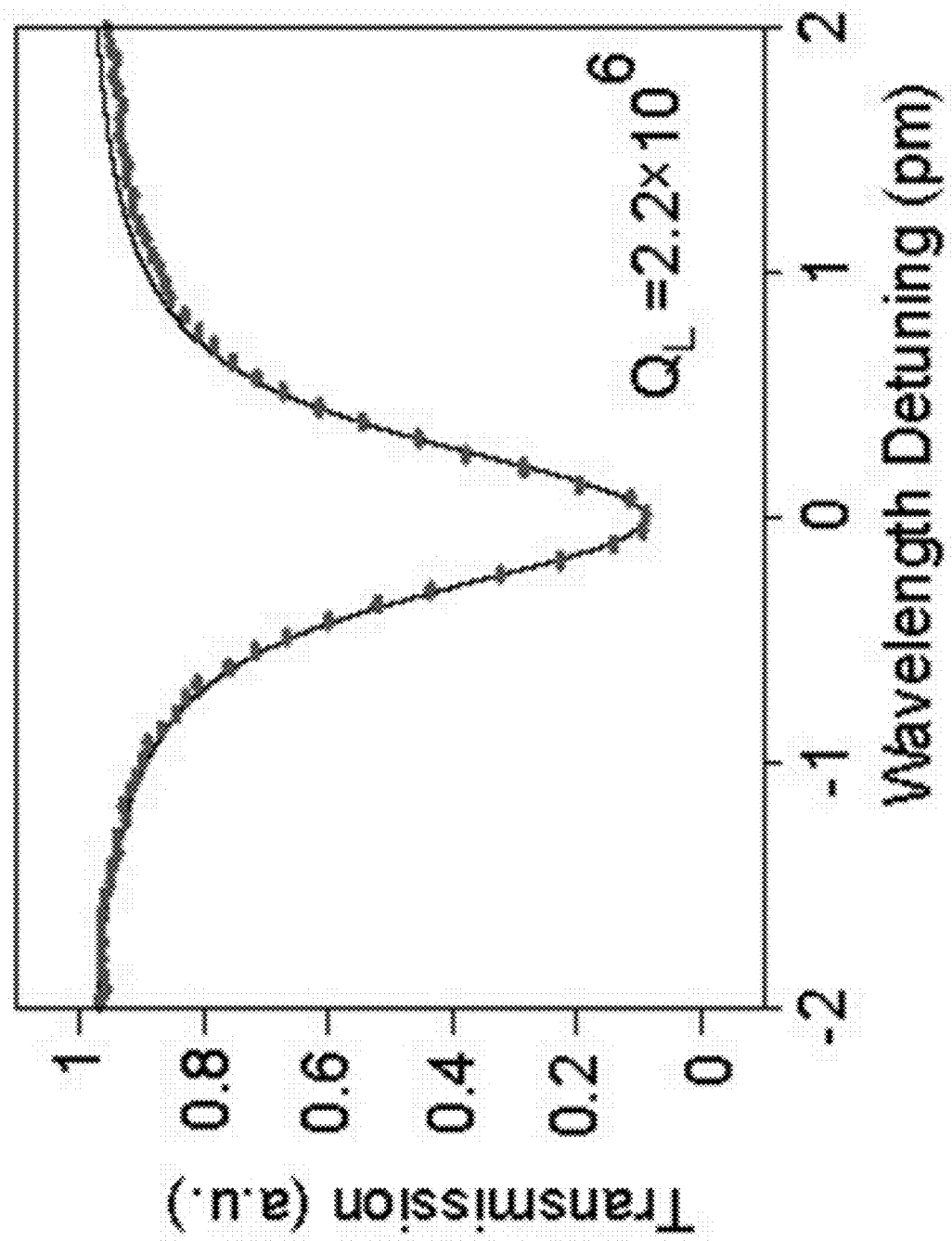
FIG. 5D is a graph showing the measured transmission of the cavity mode indicated by the arrow in FIG. 5C.

FIG. 5A shows a graph of simulated group-velocity dispersion (GVD) curves for different waveguide widths where a diagram of the waveguide cross section is provided in FIG. 5B. A waveguide width of 2.0 microns was chosen because it provides anomalous GVD with a reasonably small magnitude over a broad spectral band, appropriate for Kerr soliton comb generation, but not so small as to be sensitive to fabrication error. As shown in FIG. 4D, the anomalous GVD of the fabricated device, $-0.047$ ps$^2$/m (corresponding to $D_2/(2\pi)=1.76$ MHz shown in FIG. 4D), is close to prediction from modeling. FIG. 5C shows the transmission spectrum of the device for coupling to the quasi-TE polarization. FIG. 5D is a higher resolution scan of a cavity mode (indicated by the arrow in FIG. 5C) and shows that the device exhibits a high optical Q of 2.2 million for the loaded cavity.

Figure 6:
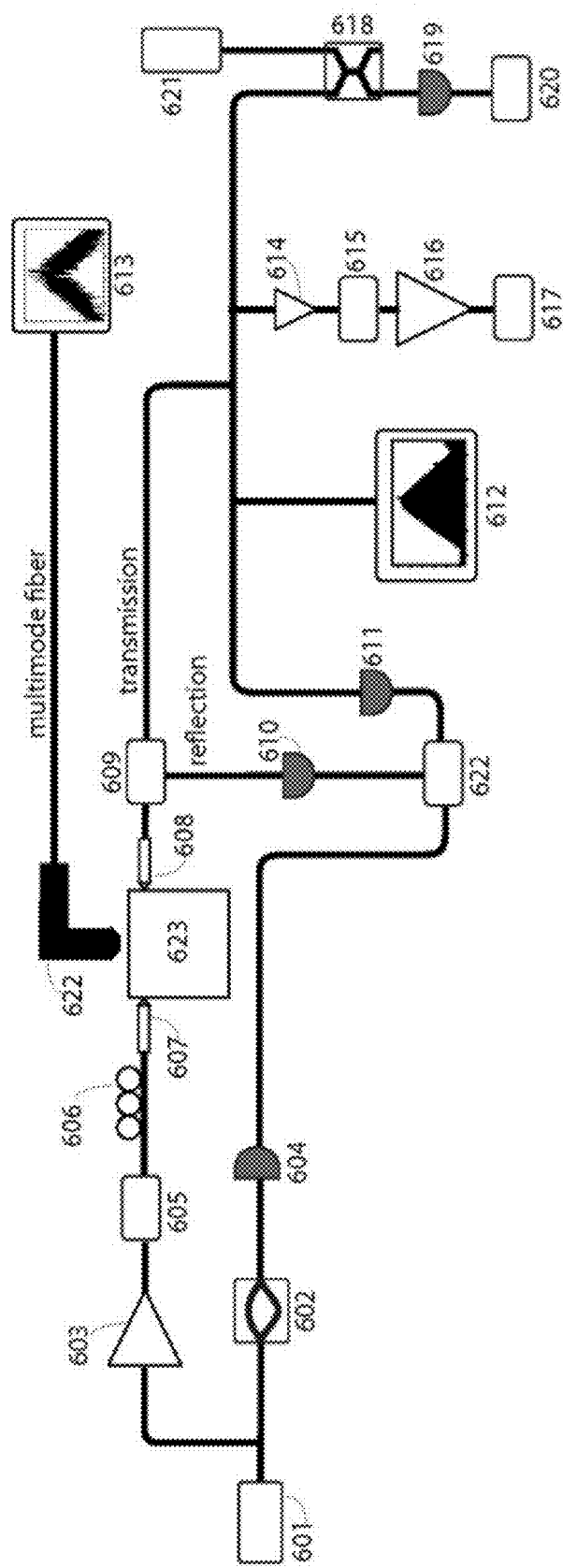
FIG. 6 is a graph illustrating the experimental testing setup used to characterize the properties of the self-starting Kerr soliton combs produced in the fabricated lithium niobate microresonator.

FIG. 6 shows a graph illustrating the schematic of the experimental testing setup. A continuous-wave (CW) telecom-band tunable laser (601) was used as the pump laser. The laser frequency was calibrated with a Mach-Zehnder interferometer (602) whose transmission was detected by a photodiode (604). The laser power was boosted by an erbium-doped fiber amplifier (EDFA, 603) whose amplified spontaneous emission (ASE) noise was suppressed by a tunable optical filter (605). The polarization of the laser was adjusted by a polarization controller (606) to match the quasi-TE polarization of the cavity mode. The pump light was coupled to the device chip (623) through a lensed fiber (607). The comb light output from the device chip was collected by another lensed fiber (608). A fiber Bragg grating (609) was used to separate the pump light from the frequency comb, and the pump light (directed to the reflection port in the schematic) was photodetected (610) to monitor the cavity transmission (FIG. 5B,C and FIG. 4E,F) by an oscilloscope (622). The comb light transmitted to the transmission port was measured using a photodetector (611) to monitor the comb power (FIG. 4G,H), an optical spectrum analyzer (612) to measure the optical spectrum, and a frequency-resolved optical gating (FROG, 617) for soliton temporal waveform characterization. In order to reach the minimum working power of FROG, an EDFA (616) boosted the comb power and a dispersion compensation unit (614 and 615) was used to compensate the dispersion introduced by the EDFA. As the repetition rate of the device is too large to be measured by an electrical spectrum analyzer (ESA, 620), the coherence of individual comb lines was studied by heterodyning with a reference CW laser (621) and measuring the electrical spectrum with an ESA (620) after they are combined with a 50:50 coupler (618) and detected with a photodiode (619). The generated second harmonic of the Kerr soliton was characterized from the light scattered from the device into free space. The scattered light was collected by an imaging microscope (622)) whose output was either recorded by a CMOS camera (spectral response: 400-1000 nm) or was delivered, via a multimode fiber (MMF), to a spectrometer (613) that covers the near infrared spectral band around 700-900 nm.

Figure 4E:
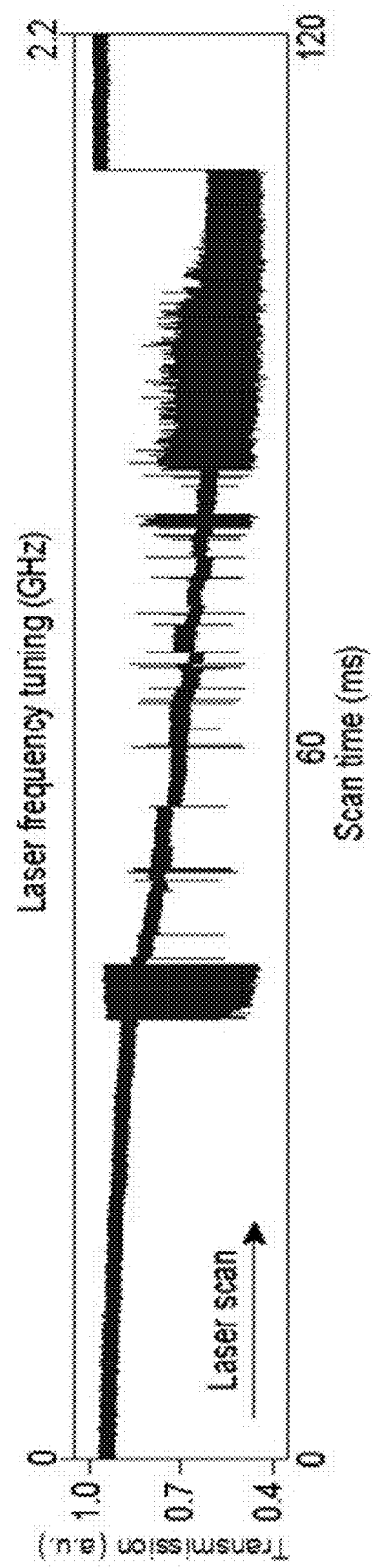
FIG. 4E is a graph showing the measured resonator transmission when the pump laser frequency is scanned from red to blue.
Figure 4F:
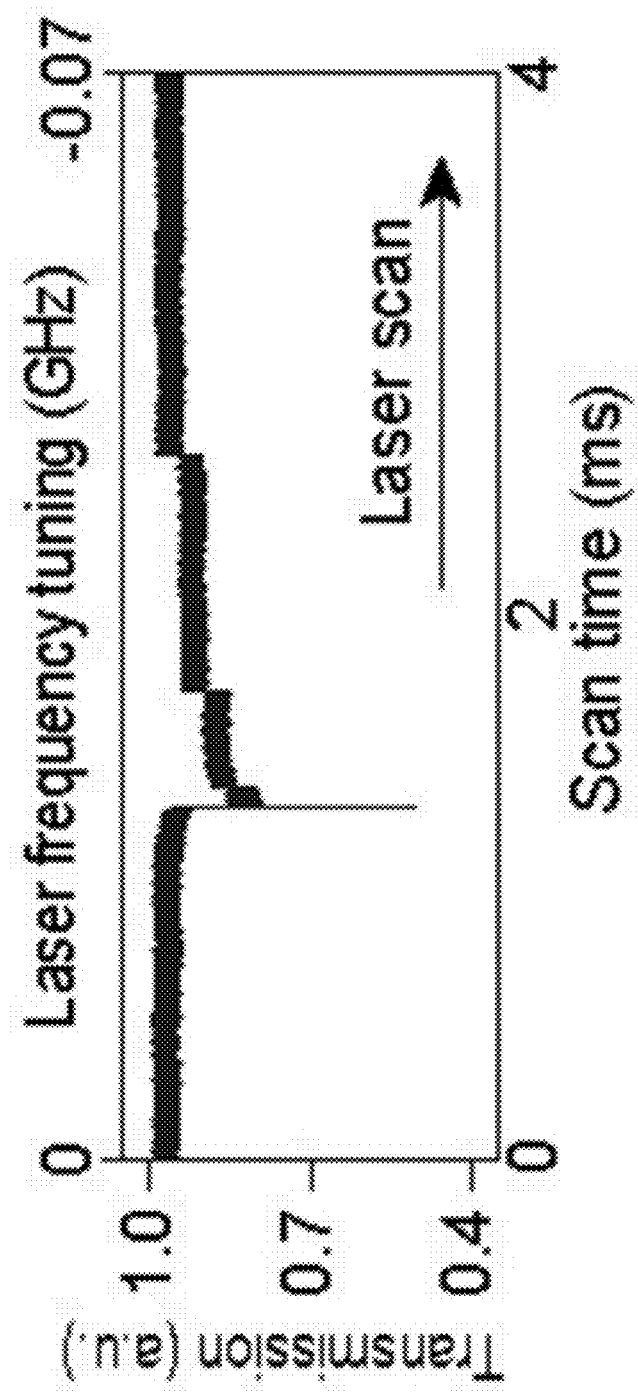
FIG. 4F is a graph showing the measured resonator transmission when the pump laser frequency is scanned from blue to red.
Figure 4G:
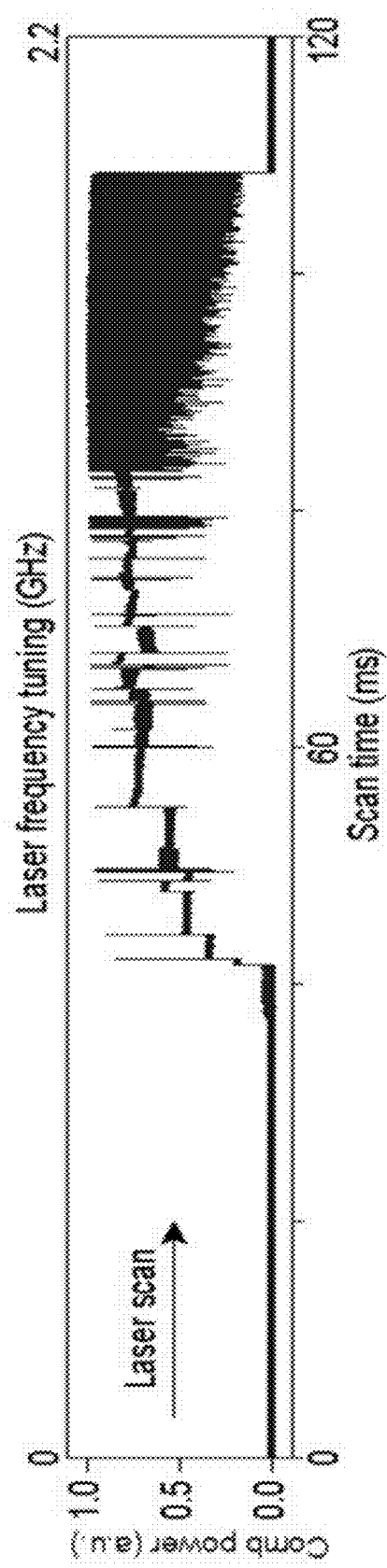
FIG. 4G is a graph showing the measured comb power when the pump laser frequency is scanned from red to blue, corresponding to FIG. 4E.
Figure 4H:
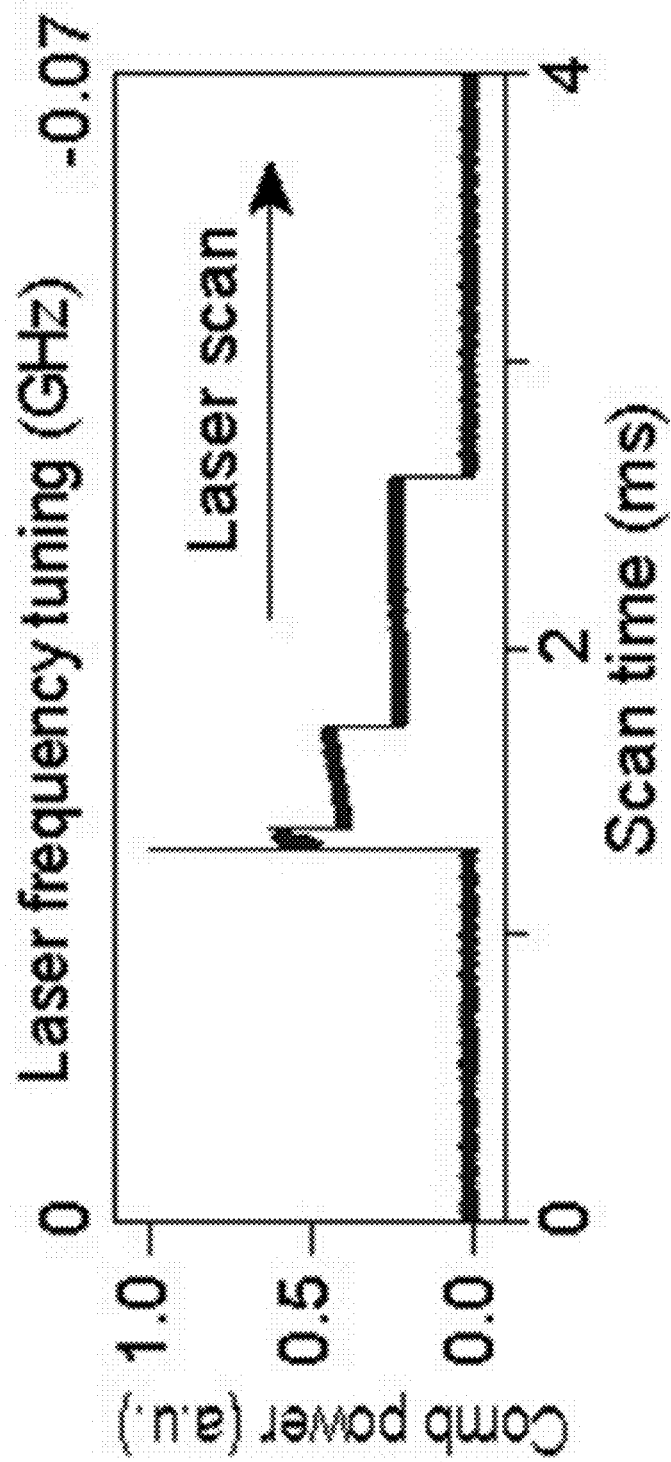
FIG. 4H is a graph showing the measured comb power when the pump laser frequency is scanned from blue to red, corresponding to FIG. 4F.
Figure 41:
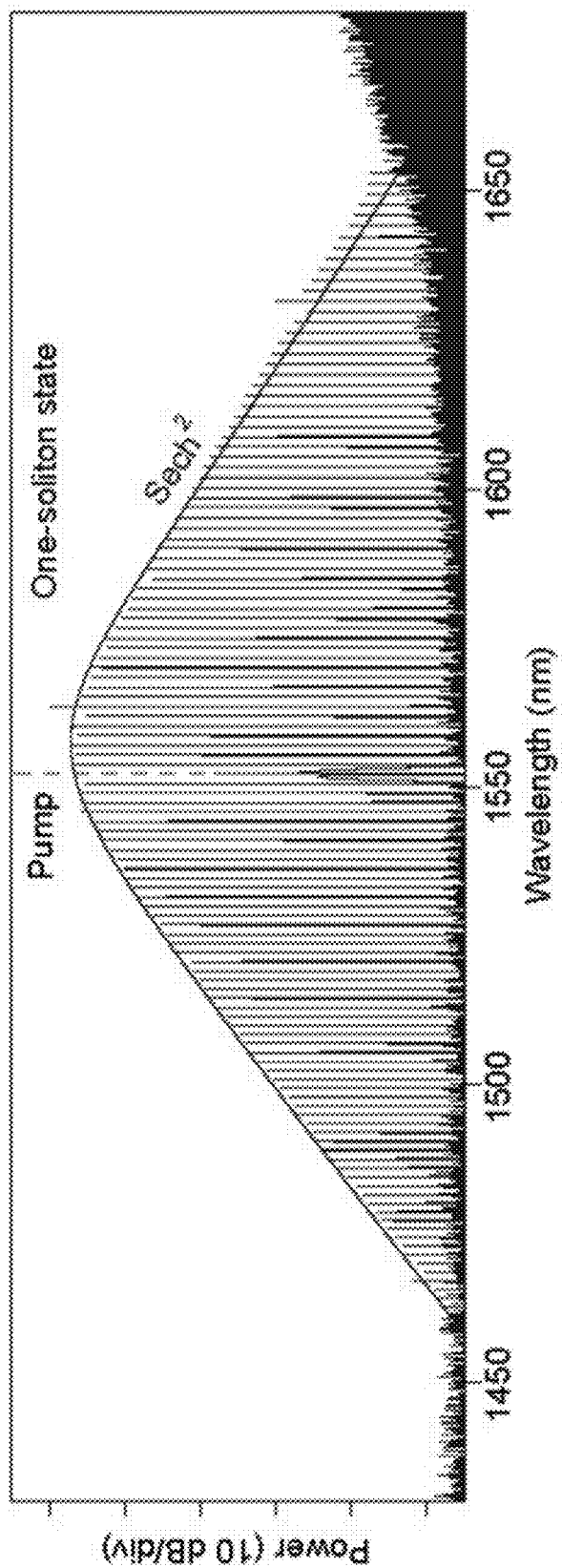
Figure 4J:
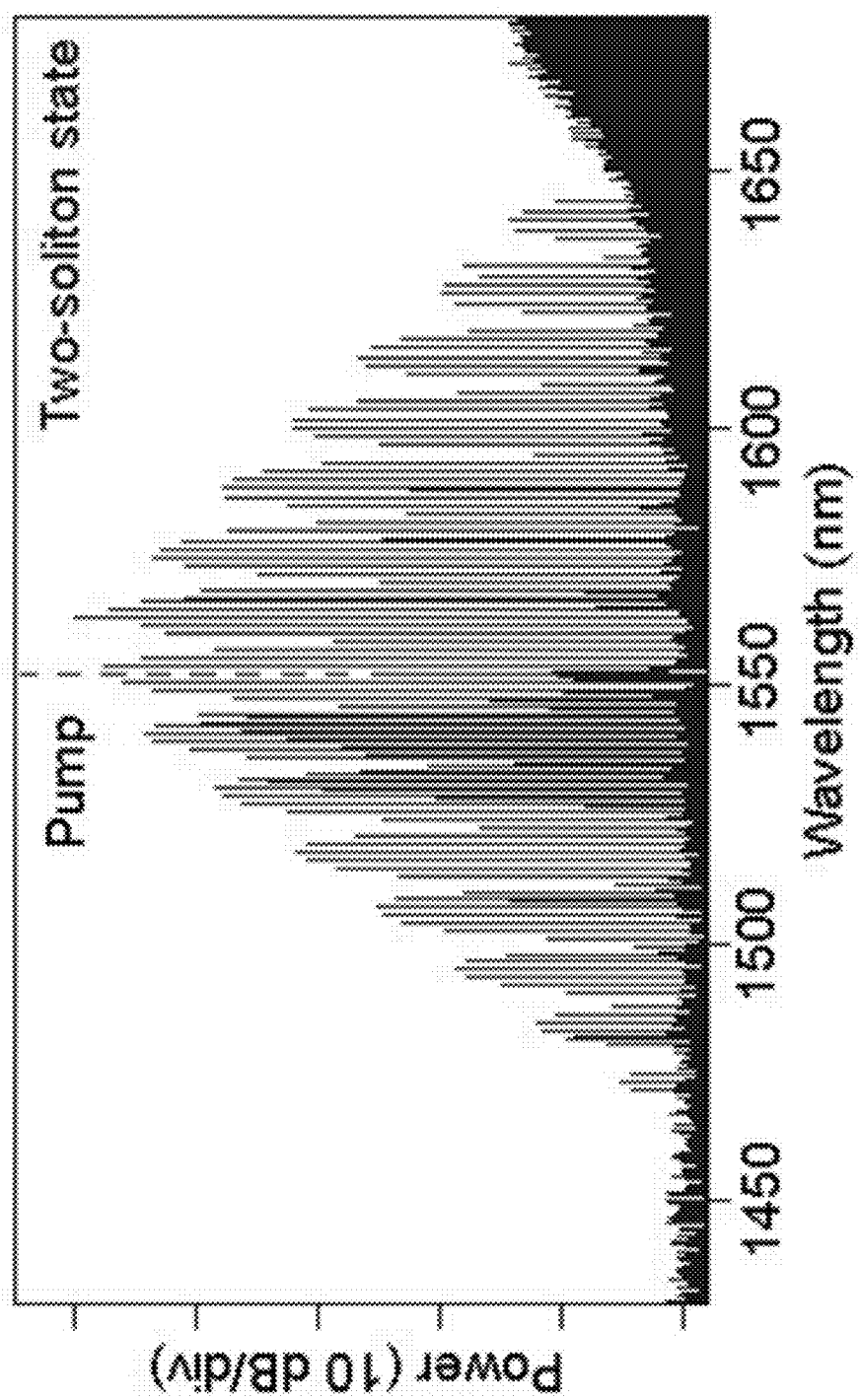
FIG. 4J is a graph showing the measured comb spectrum of the two-soliton state.
Figure 4K:
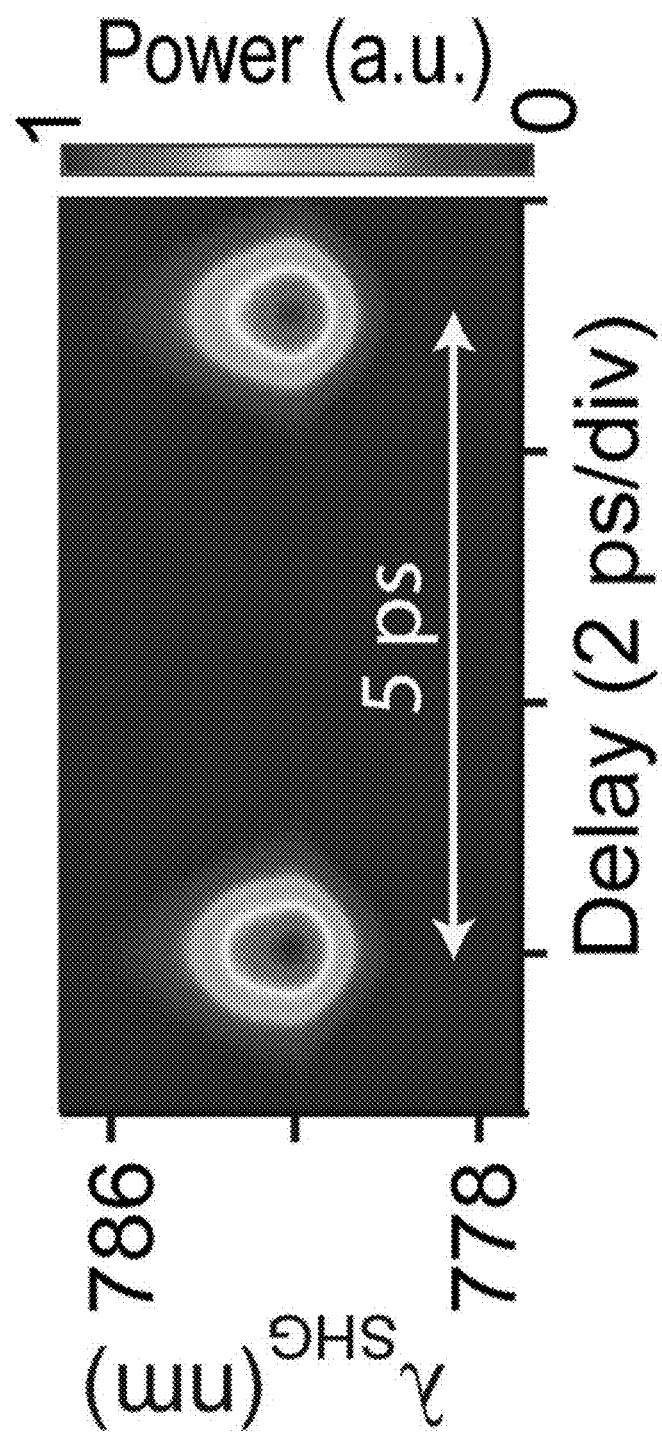
FIG. 4K is a graph showing the measured frequency-resolved optical gating (FROG) spectrogram of the single-soliton state.
Figure 4L:
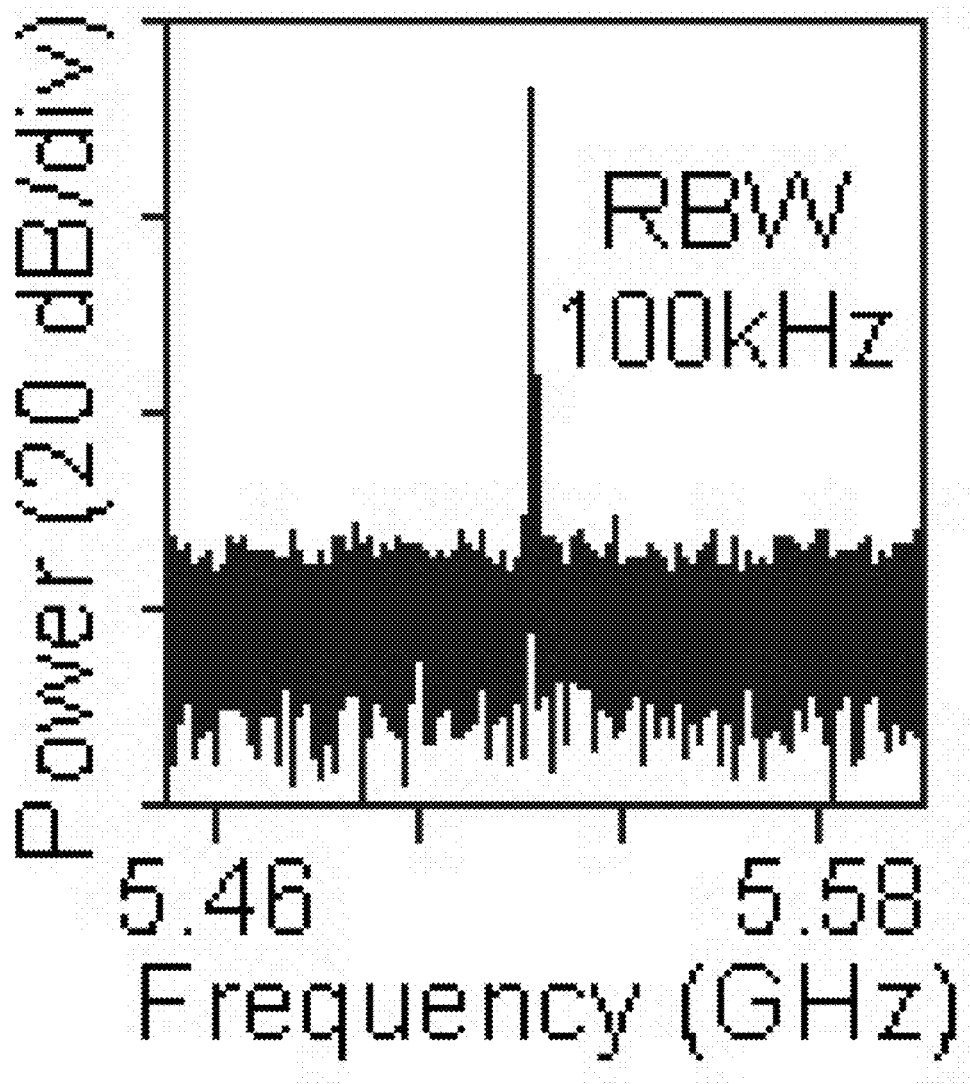
FIG. 4L is a graph showing the measured spectrum of the heterodyned beat note between a CW laser and a comb line.

FIG. 4E,F show the pump transmission and FIG. 4G,H show the corresponding produced comb power for pump frequency scanning in both tuning directions. The comb power versus tuning shows discrete steps (FIG. 4G,H), a signature of soliton mode locking. FIG. 4I,J show the optical spectra of the produced single-soliton and two-soliton comb state, respectively, both of which exhibit hyperbolic secant square spectral shape. Accessing the soliton regime from the red detuning side as observed here has not been reported before and allows the soliton regime to be entered without the need for triggering techniques [29]. The high coherence of the produced soliton comb is verified with the temporal waveform of the output pulses by frequency-resolved optical gating (FROG). As shown in FIG. 4K, the recorded FROG spectrogram indicates pulse waveforms with a period of 5 picoseconds, corresponding to the round-trip-time of the microresonator. To further characterize the coherence of the comb lines, a tunable external cavity diode laser was heterodyned with a microcomb line. As shown in FIG. 4L, the beat note exhibits a signal-to-noise ratio greater than 40 dB indicating the high coherence of the comb lines.

Figure 7A:
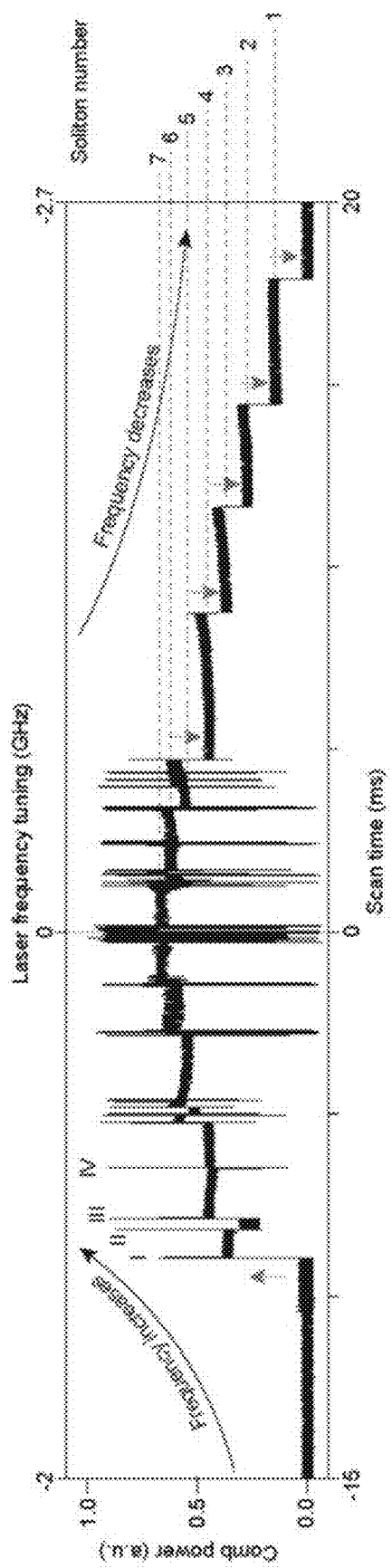
FIG. 7A is a graph showing the measured comb power when the pump laser frequency is tuned from red to blue and blue to red.
Figure 7B:
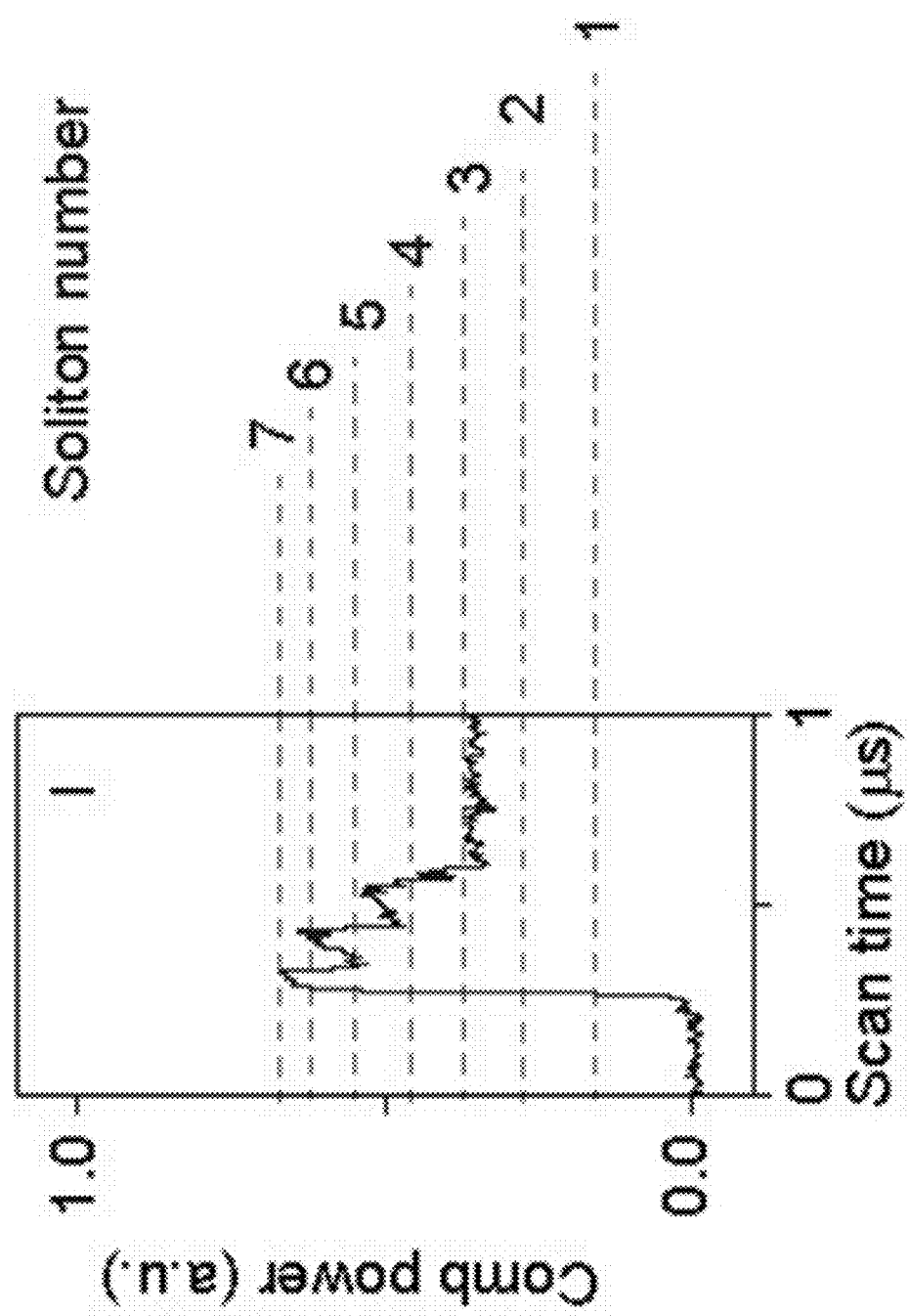
FIG. 7B is a graph showing the detailed temporal waveform of the power spike indicated as I in FIG. 7A.
Figure 7C:
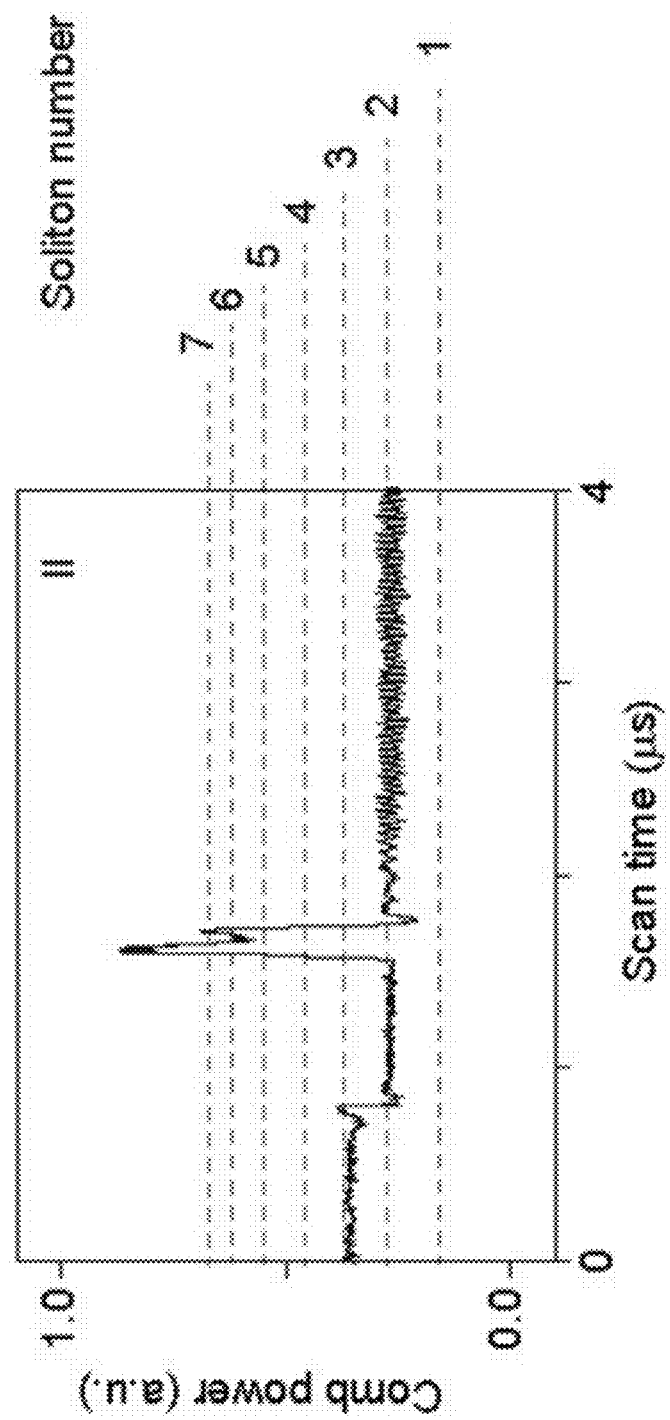
FIG. 7C is a graph showing the detailed temporal waveform of the power spike indicated as II in FIG. 7A.
Figure 7D:
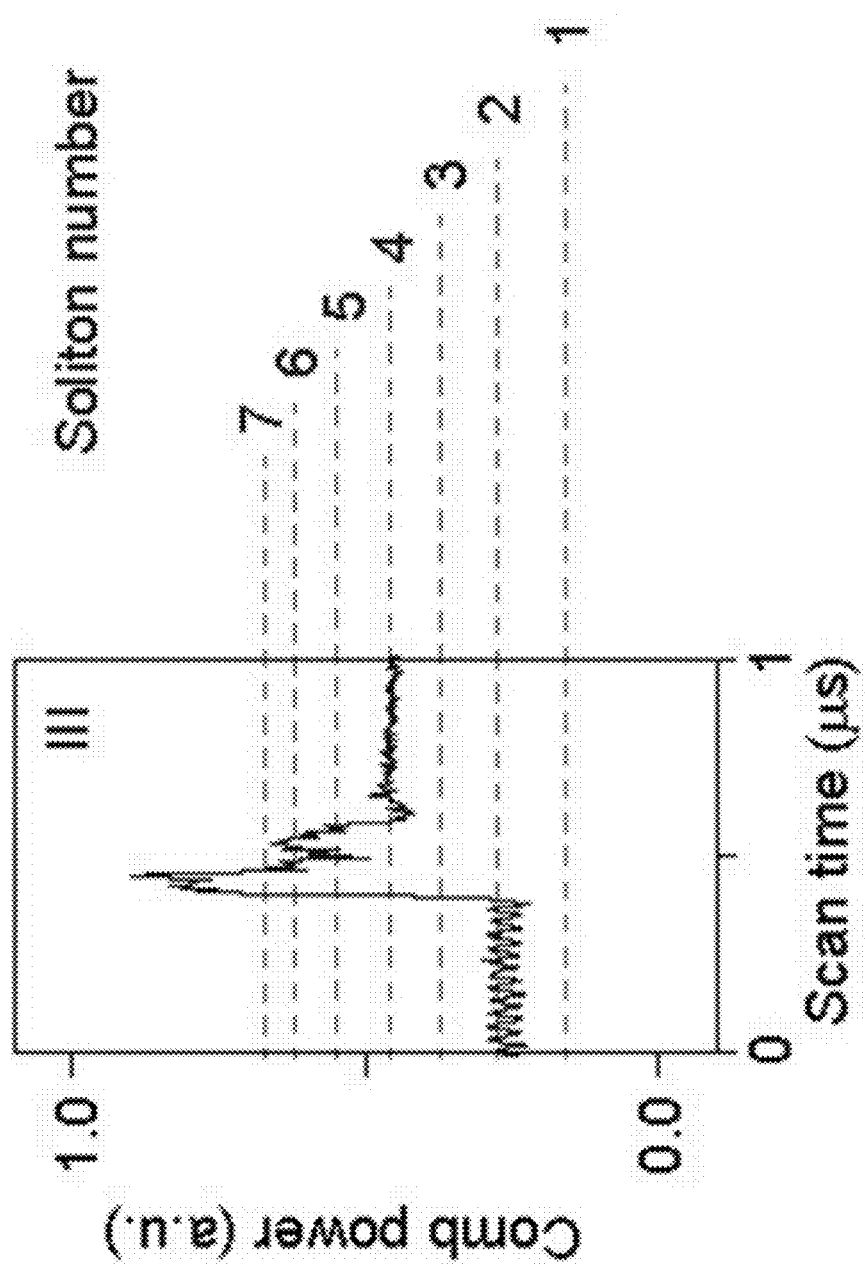
FIG. 7D is a graph showing the detailed temporal waveform of the power spike indicated as III in FIG. 7A.
Figure 7E:
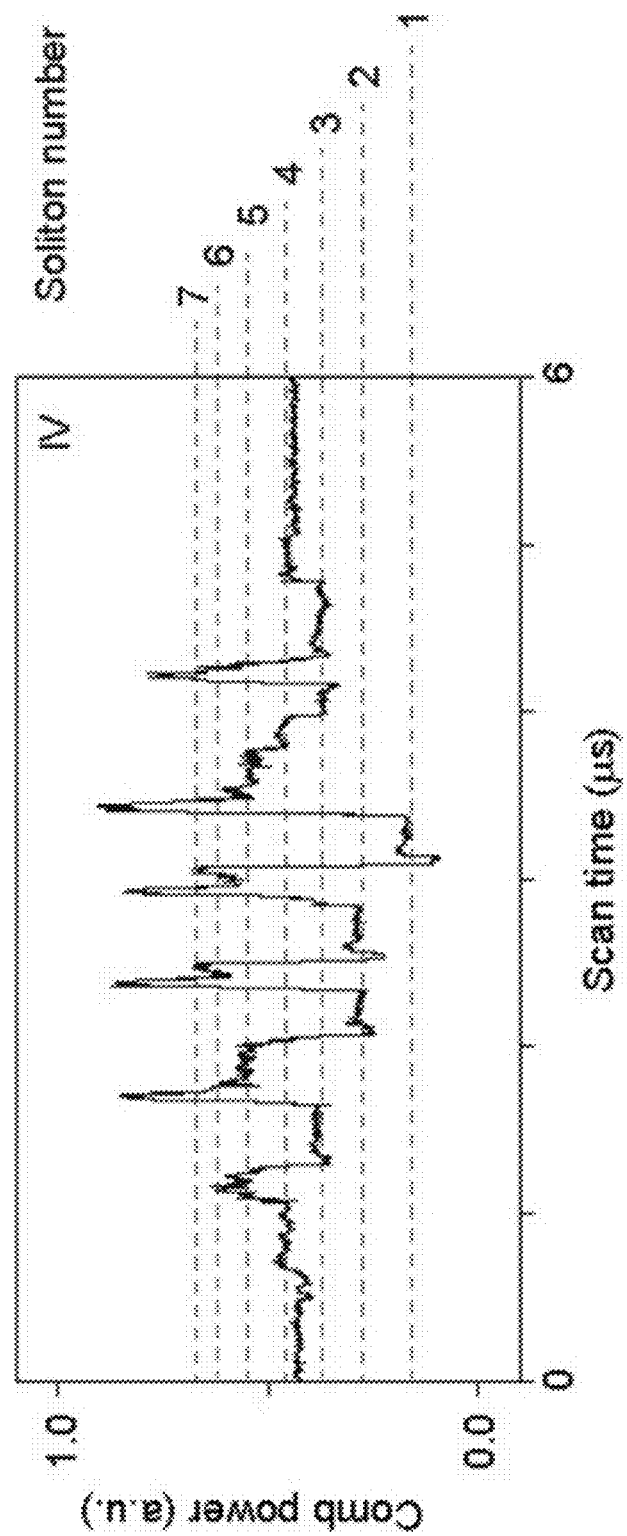
FIG. 7E is a graph showing the detailed temporal waveform of the power spike indicated as IV in FIG. 7A.
Figure 8A:
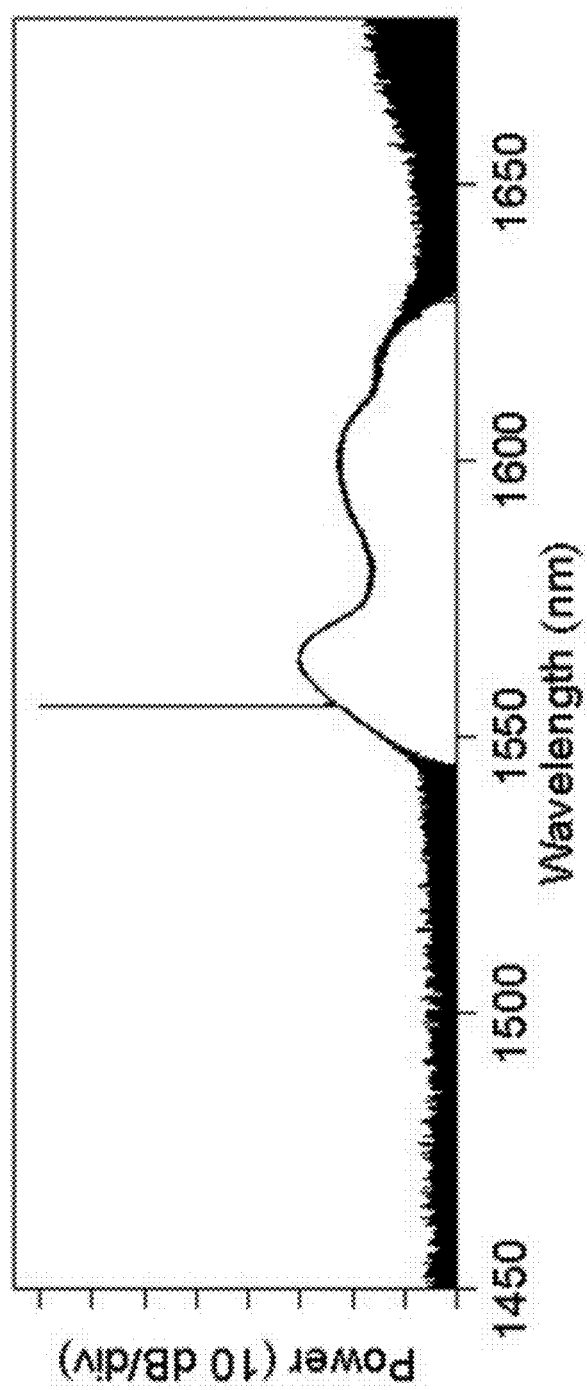
FIG. 8A is a graph showing the optical spectrum of the resonator output in the telecom band, before the soliton comb is produced.
Figure 8B:
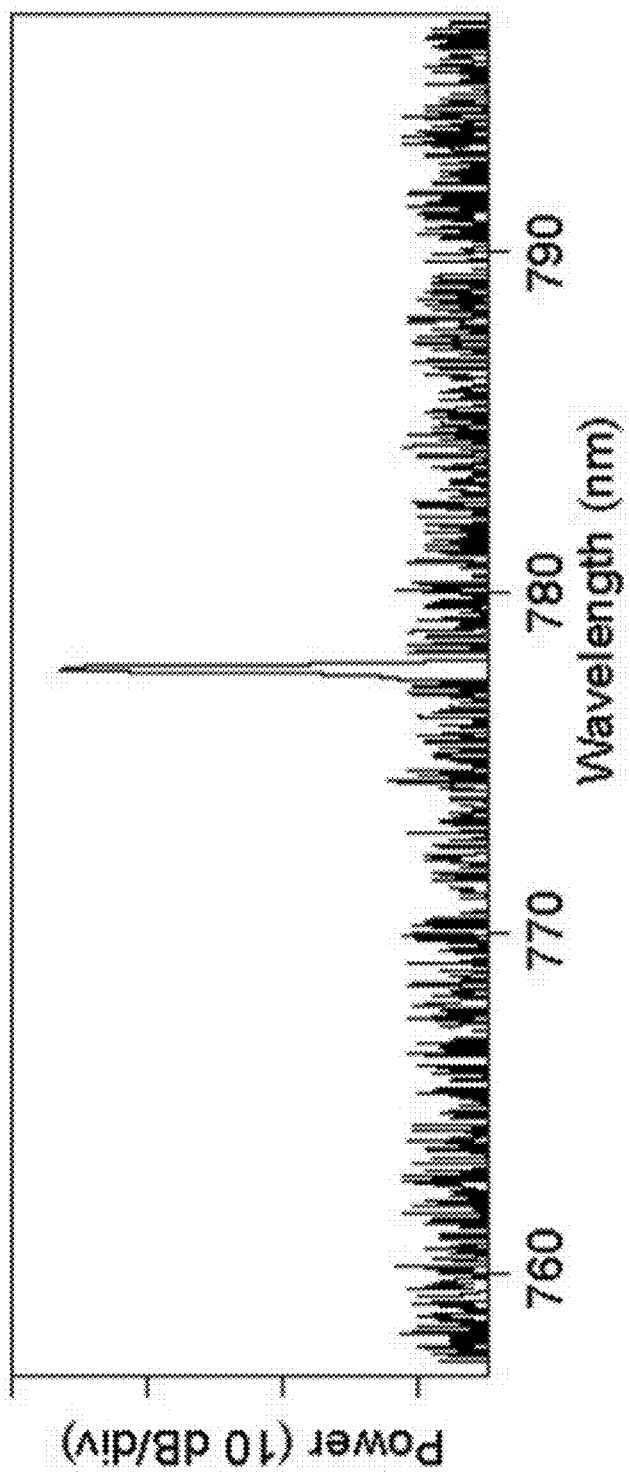
FIG. 8B is a graph showing the optical spectrum of the resonator output in the near infrared, corresponding to FIG. 8A.
Figure 8C:
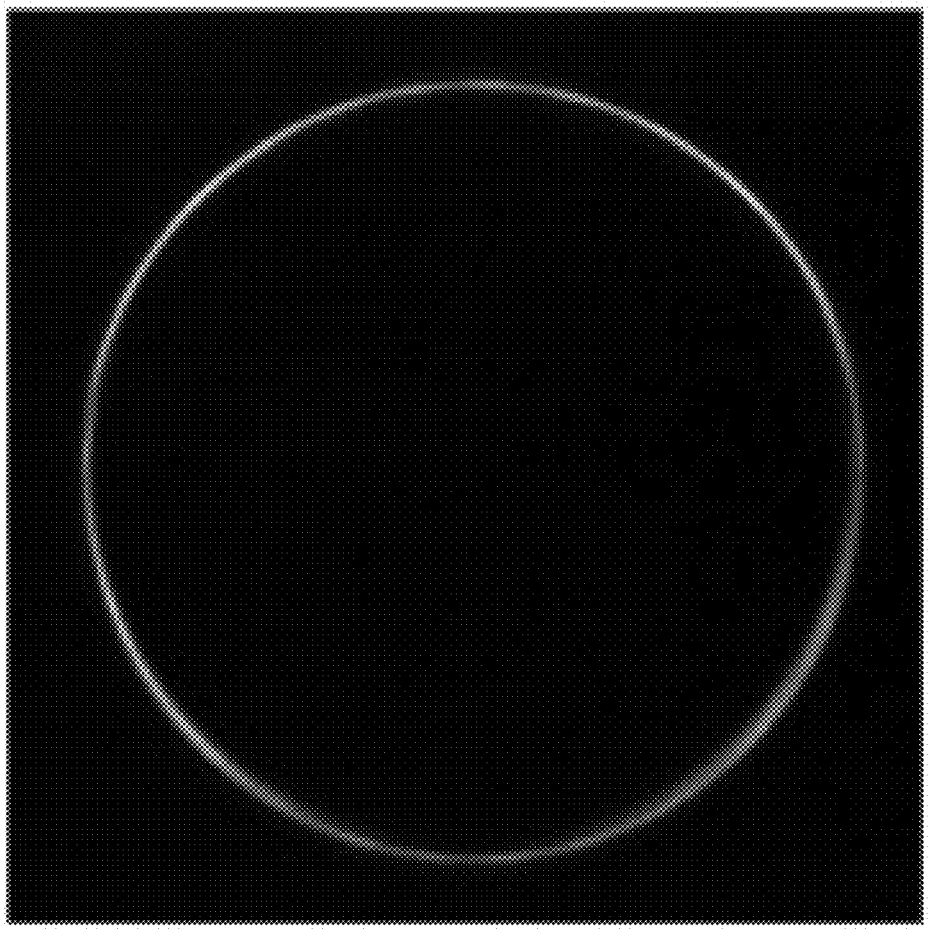
FIG. 8C is an optical image of the device, corresponding to FIGS. 8A and 8B.
Figure 8D:
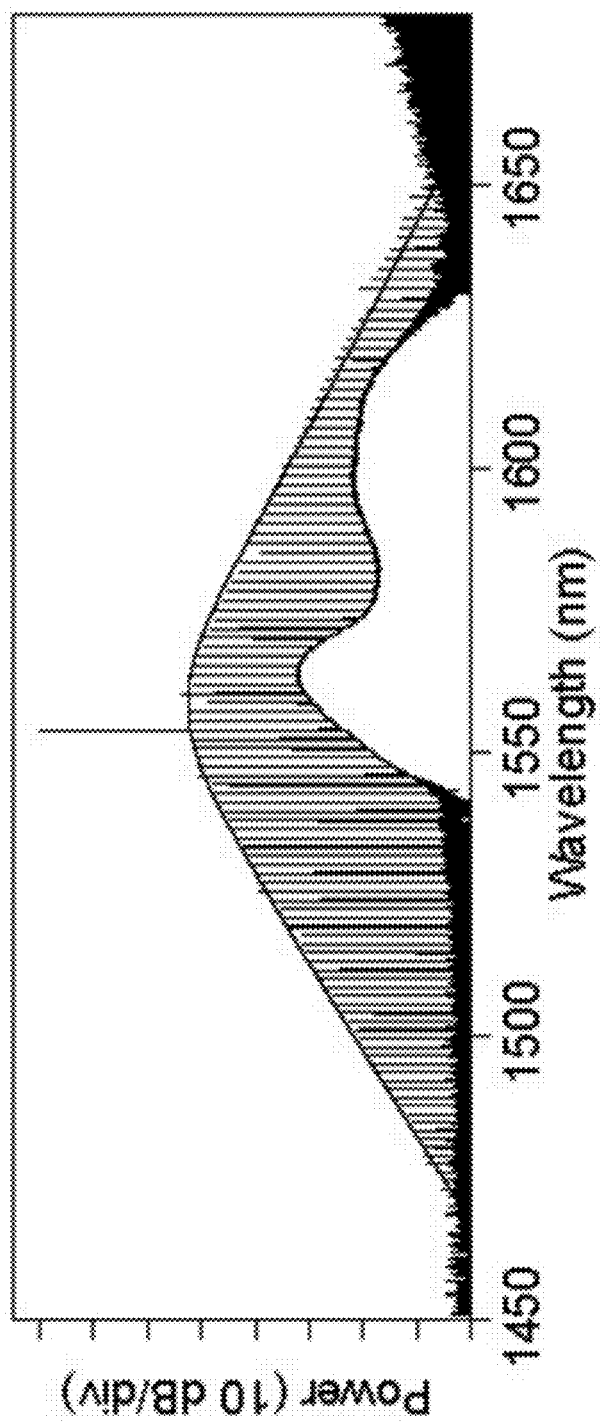
FIG. 8D is a graph showing the optical spectrum of the produced single-soliton comb output from the resonator, in the telecom band.
Figure 8E:
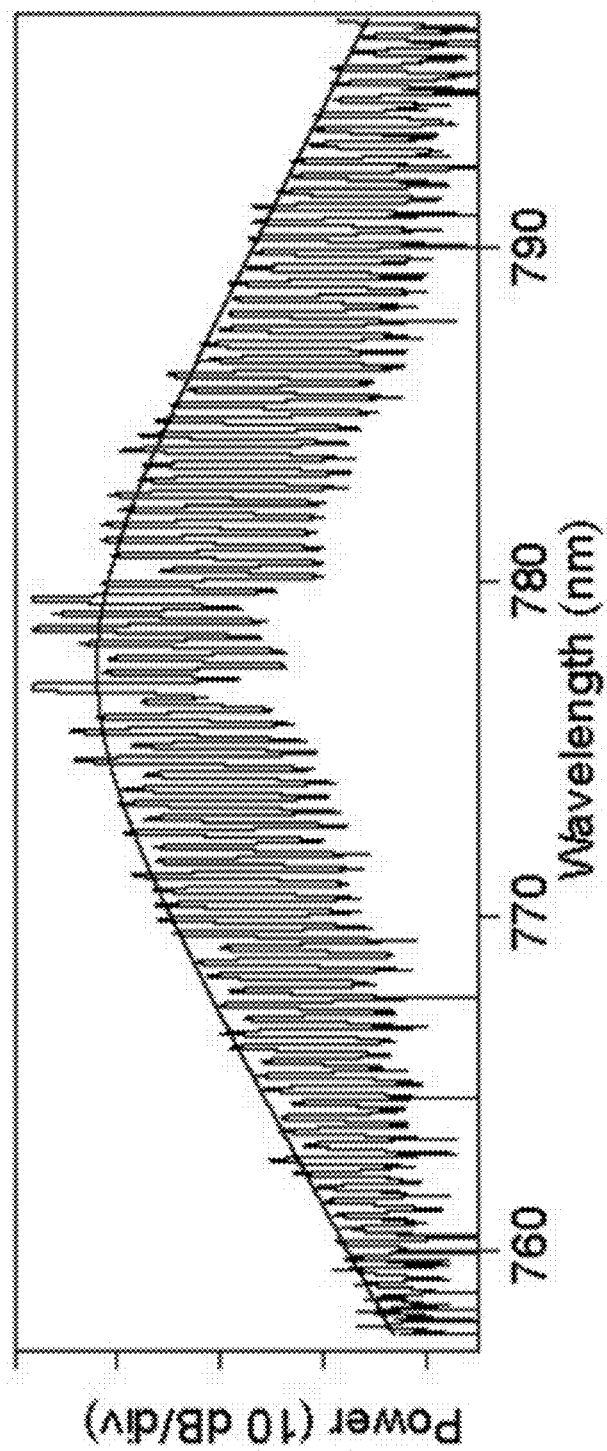
FIG. 8E is a graph showing the optical spectrum of up-converted single-soliton comb in the near infrared, corresponding to FIG. 8D.
Figure 8F:
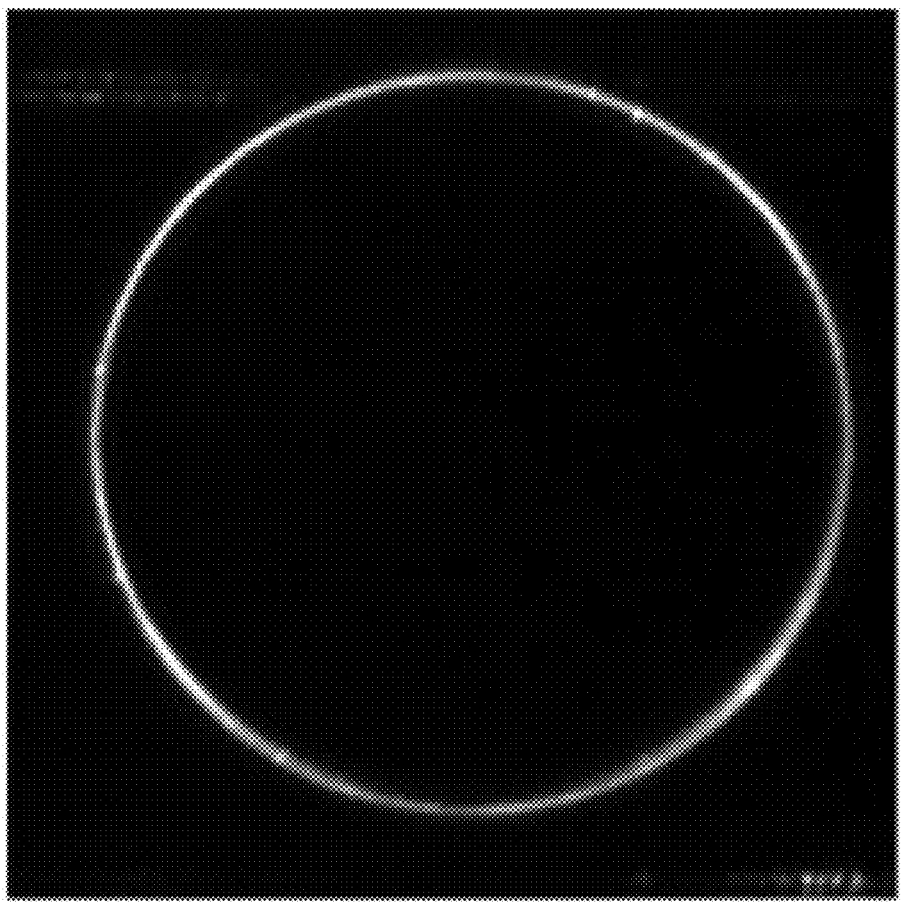
FIG. 8F is an optical image of the device, corresponding to FIGS. 8D and 8E.
Figure 8G:
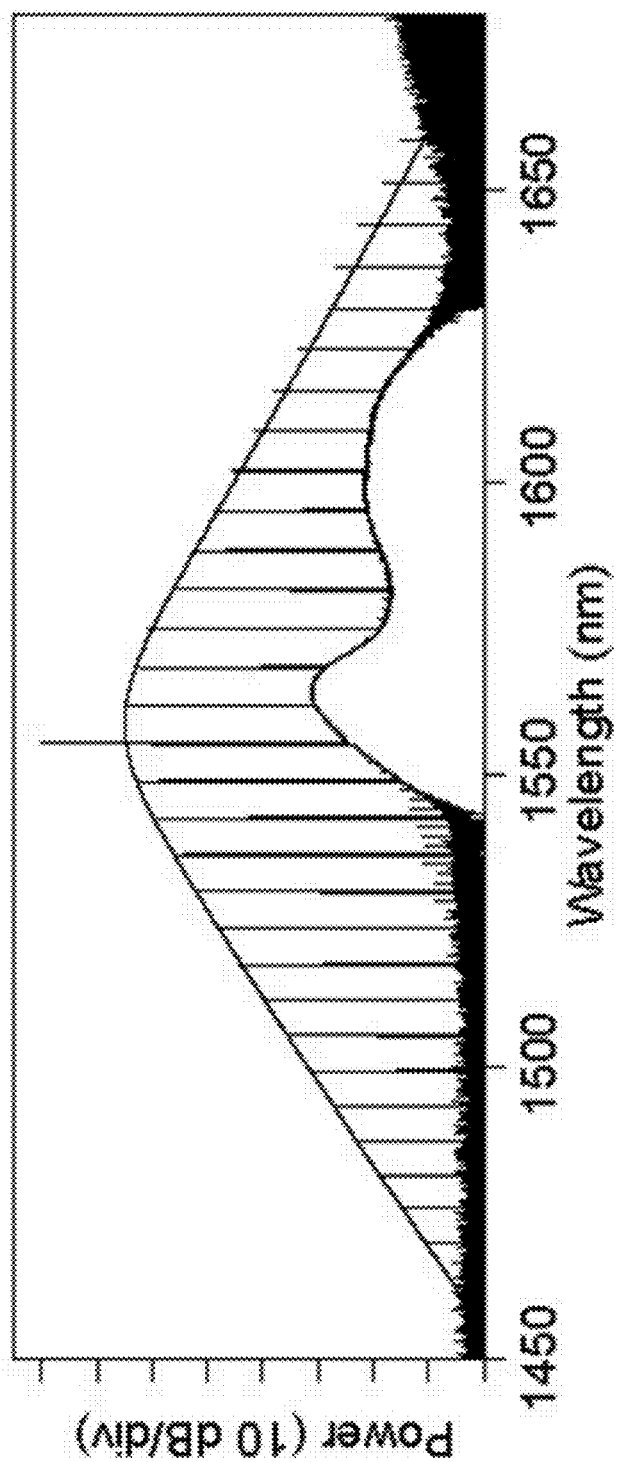
FIG. 8G is a graph showing the optical spectrum of soliton-crystal comb output from the resonator, in the telecom band.
Figure 8H:
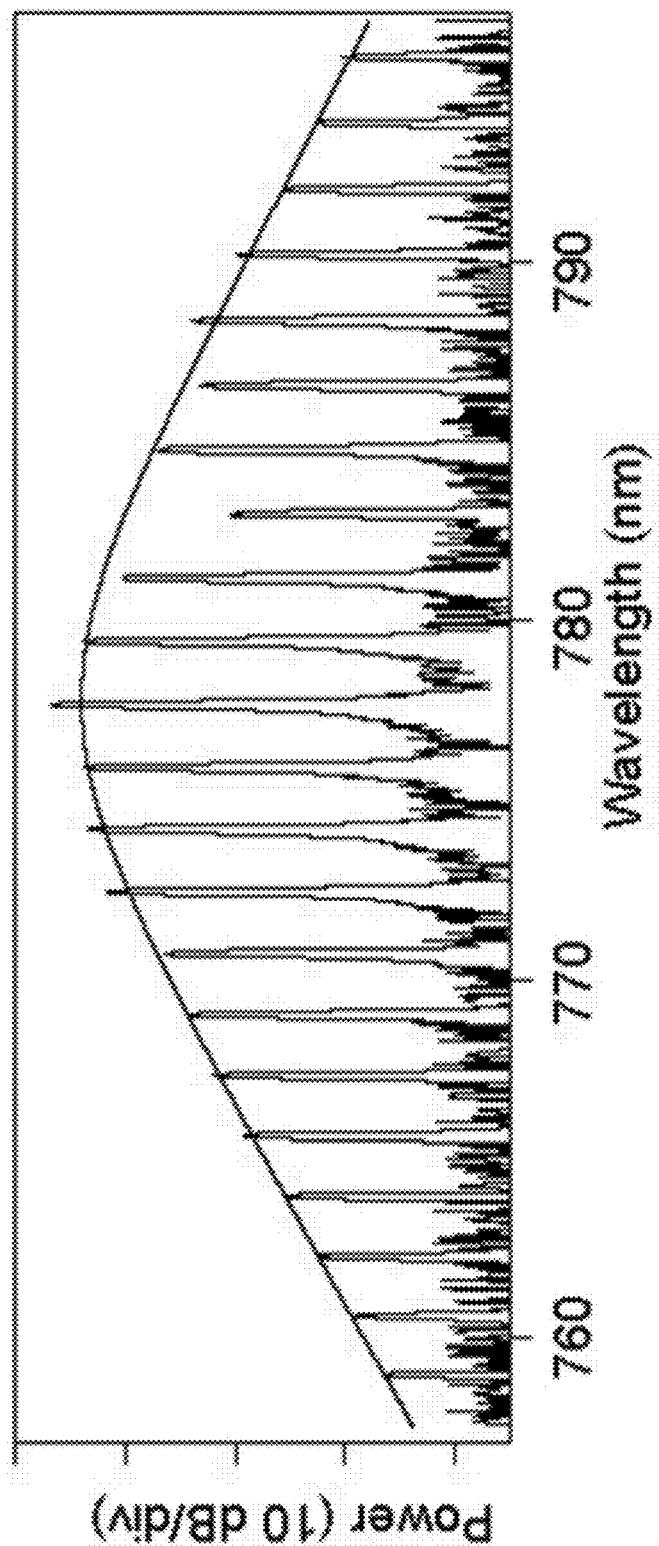
FIG. 8H is a graph showing the optical spectrum of up-converted soliton-crystal comb in the near infrared, corresponding to FIG. 8G.
Figure 81:
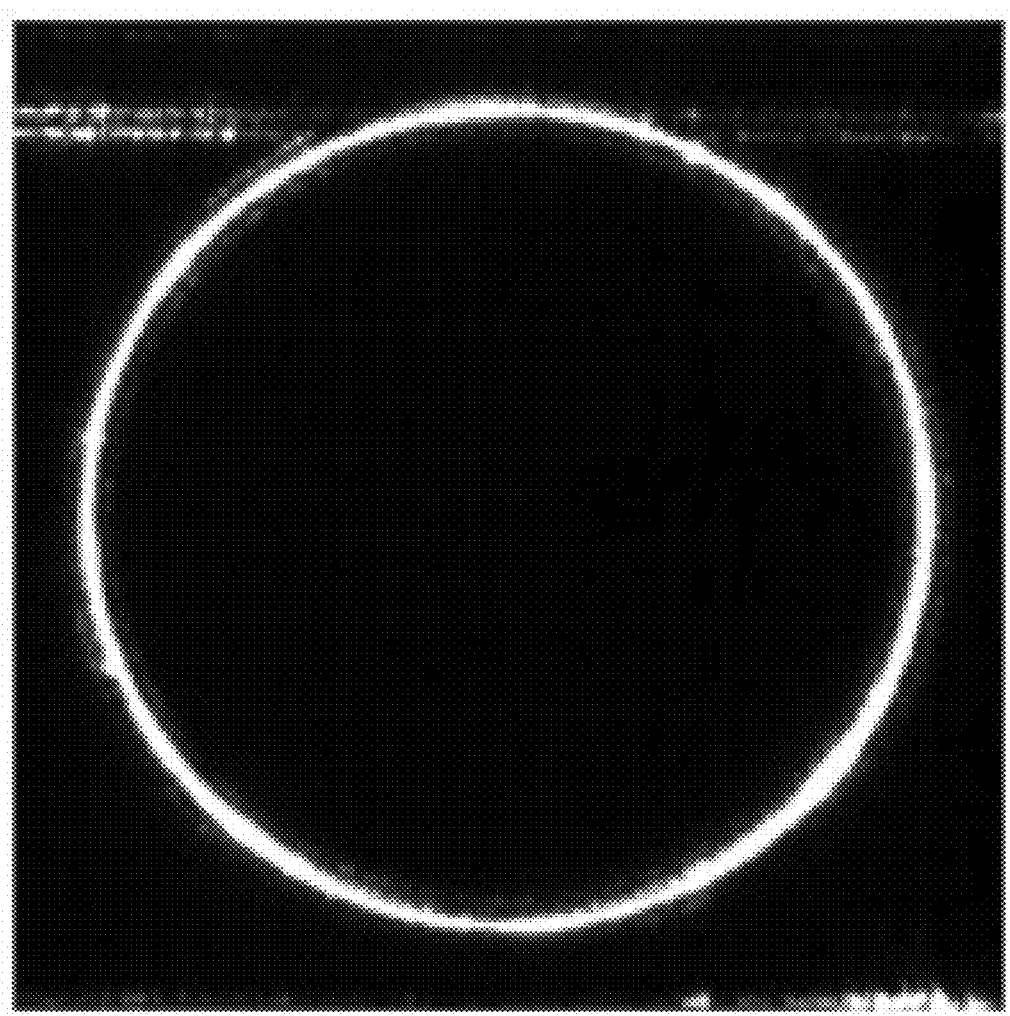

FIG. 7A shows the unique bi-directional switching phenomenon of the self-starting silicon combs in the lithium niobate microresonator device. The stabilization introduced by the photorefractive process enables bi-directional switching between different soliton states, a phenomenon that has so far not been possible in other soliton microcomb systems [29]. To demonstrate this phenomenon, the laser frequency was scanned up and down across a few soliton steps for red-detuned operation. As shown in FIG. 7A, when the laser frequency increases the comb power climbs up along discrete steps, indicating that the Kerr comb transits from lower number to higher number soliton states. Then, when the laser frequency decreases the comb power steps down discretely, indicating a reverse transitioning of soliton states. Increasing soliton number steps are observed to exhibit richer dynamics compared with the decreasing number process. Specifically, an increase in soliton number is frequently accompanied by a power spike, while decreasing steps have no spiking behavior. Also, temporal resolution of the power spikes reveals a step-like substructure as shown in FIG. 7B,C,D,E. These spikes become less prominent when the laser scan speed is slowed.

FIG. 8 shows the frequency doubling of Kerr soliton combs produced inside the lithium niobate microresonator devices. Lithium niobate exhibits a significant quadratic optical nonlinearity, which enables the frequency up-conversion of the Kerr solitons inside the cavity to produce a bi-chromatic soliton microcomb, which has never been realized before. As shown in FIGS. 8A and 8B, before the soliton microcomb is produced, the pump laser launched into the cavity generates only a small amount of up-converted light. In this condition weak second-harmonic emission is visible in the light scattered from the microresonator (FIG. 8C). However, when the soliton is formed (FIG. 8D), its high peak power enhances the up-conversion process, resulting in a brighter image of the scattered second harmonic light (FIG. 8F). As shown in FIG. 8E, the spectrum of the second harmonic exhibits an overall $sech^2$ shape. Second harmonic generation of a soliton crystal (FIG. 8G) is shown in FIG. 8H and FIG. 8I. The overall power of the soliton crystal is higher inside the cavity resulting in higher power of the generated second harmonic and a considerably brighter image of the scattered light, as shown in FIG. 8I. The spectrum of the second harmonic again exhibits a clear $sech^2$ shape as shown in FIG. 8H.

Part 4—Exemplary Materials for a Self-Starting Soliton Microcomb Device

The negative nonlinear bistability described hereinabove can be realized, for example, by the following approaches.

Devices according to the Application can be made from materials with significant photorefractive effect, such as, for example, lithium niobate ($LiNbO_3$), lithium tantalate ($LiTaO_3$), potassium niobate ($KNbO_3$), gallium arsenide (GaAs), indium phosphide (InP), etc.

Devices according to the Application can be made from materials with significant pyroelectric and electro-optic effect, such as, for example, lithium niobate ($LiNbO_3$), gallium nitride (GaN), lithium tantalate ($LiTaO_3$), etc.

Devices according to the Application can be made from materials with significant negative thermo-optic coefficient, such as, for example: 1) BBO, LBO, LYF, $CaF_2$, etc., at room temperature; or 2) materials at certain temperatures where the thermo-optic coefficient become negative; or 3) device coated with certain materials (e.g. $TiO_2$, or PDMS polymer, etc.) such that the overall thermo-optic coefficient becomes negative.

Devices according to the Application can be made from materials with significant negative thermal expansion coefficient.

Devices according to the Application can be made from materials which exhibit above effects along a certain polarization that is employed for Kerr comb generation.

Device structures can exhibit a significant negative effective thermo-optic coefficient or negative effective thermal expansion coefficient.

Device materials can exhibit multiple effects listed above, some of them negative, some others positive. It is only important that an overall combined effect of any material selection, device structure, and any combination thereof, results in a negative nonlinear bistability. As long as the overall nonlinear bistability becomes negative, the soliton mode locking can be self-starting.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCES

[1] P. Del'Haye, A. Schliesser, O. Arcizet, T. Wilken, R. Holzwarth, and T. J. Kippenberg, "Optical frequency comb generation from a monolithic microresonator," Nature 450, 1214-1217 (2007).

[2] J. S. Levy, A. Gondarenko, M. A. Foster, A. C. Turner-Foster, A. L. Gaeta, and M. Lipson, "CMOS-compatible multiple-wavelength oscillator for on-chip optical interconnects," Nature Photon. 4, 37-40 (2010).

[3] L. Razzari, D. Duchesne, M. Ferrera, R. Morandotti, S. Chu, B. E. Little, and D. J. Moss, "CMOS-compatible integrated optical hyper-parametric oscillator," Nature Photon. 4, 41-45 (2010).

[4] A. A. Savchenkov, A. B. Matsko, W. Liang, V. S. Ilchenko, D. Seidel, and L. Maleki, "Kerr combs with selectable central frequency," Nature Photon. 5, 293-296 (2011).

[5] W. Liang, A. A. Savchenkov, A. B. Matsko, V. S. Ilchenko, D. Seidel, and L. Maleki, "Generation of near-infrared frequency combs from a $MgF_2$ whispering gallery mode resonator," Opt. Lett. 36, 2290-2292 (2011).

[6] F. Ferdous, H. Miao, D. E. Leaird, K. Srinivasan, J. Wang, L. Chen, L. T. Varghese, and A. M. Weiner, "Spectral line-by-line pulse shaping of on-chip microresonator frequency combs," Nature Photon. 5, 770-776 (2011).

[7] J. Li, H. Lee, T. Chen, and K. J. Vahala, "Low-Pump-Power, Low-Phase-Noise, and Microwave to Millimeter-Wave Repetition Rate Operation in Microcombs," Phys. Rev. Lett. 109, 233901 (2012).

[8] C. Y. Wang, T. Herr, P. Del'Haye, A. Schliesser, J. Hofer, R. Holzwarth, T. W. Halisch, N. Picque, and T. J. Kippenberg, "Mid-infrared optical frequency combs at 2.5 µm based on crystalline microresonators," Nature Comm. 4, 1345 (2013).

[9] H. Jung, C. Xiong, K. Y. Fong, X. Zhang, and H. X. Tang, "Optical frequency comb generation from aluminum nitride microring resonator," Opt. Lett. 38, 2810-2813 (2013).

[10] T. Herr, V. Brasch, J. D. Jost, C. Y. Wang, N. M. Kondratiev, M. L. Gorodetsky, and T. J. Kippenberg, "Temporal solitons in optical microresonators," Nature Photon. 8, 145-152 (2014).

[11] B. J. M. Hausmann, I. Bulu, V. Venkataraman, P. Deotare, and M. Lončar, "Diamond nonlinear photonics," Nature Photon. 8, 369-374 (2014).

[12] S. B. Papp, K. Beha, P. Del'Haye, F. Quinlan, H. Lee, K. J. Vahala, and S. A. Diddams, "Microresonator frequency comb optical clock," Optica 1, 10-14 (2014).

[13] H. Jung, R. Stoll, X. Guo, D. Fischer, and H. X. Tang, "Green, red, and IR frequency comb line generation from single IR pump in AlN microring resonator," Optica 1, 396-399 (2014).

[14] A. G. Griffith, R. K. W. Lau, J. Cardenas, Y. Okawachi, A. Mohanty, R. Fain, Y. H. D. Lee, M. Yu, C. T. Phare, C.

B. Poitras, A. L. Gaeta, and M. Lipson, "Silicon-chip mid-infrared frequency comb generation," Nature Comm. 6, 6299 (2015).

[15] X. Yi, Q.-F. Yang, K. Y. Yang, M.-G. Suh, and K. Vahala, "Soliton frequency comb at microwave rates in a high-Q silica microresonator," Optica 2, 1078-1085 (2015).

[16] C. Joshi, J. K. Jang, K. Luke, X. Ji, S. A. Miller, A. Klenner, Y. Okawachi, M. Lipson, and A. L. Gaeta, "Thermally controlled comb generation and soliton modelocking in microresonators," Opt. Lett. 41, 2565 (2016).

[17] M. Karpov, H. Guo, A. Kordts, V. Brasch, M. H. P. Pfeiffer, M. Zervas, M. Geiselmann, and T. J. Kippenberg, "Raman Self-Frequency Shift of Dissipative Kerr Solitons in an Optical Microresonator," Phys. Rev. Lett. 116, 103902 (2016).

[18] M. Pu, L. Ottaviano, E. Semenova, and K. Yvind, "Efficient frequency comb generation in AlGaAs-on-insulator," Optica 3, 823-826 (2016).

[19] Q.-F. Yang, X. Yi, K. Y. Yang, and K. Vahala, "Stokes solitons in optical microcavities," Nature Phys. 13, 53-57 (2017).

[20] M.-G. Suh, Q.-F. Yang, K. Y. Yang, X. Yi, and K. J. Vahala, "Microresonator soliton dual-comb spectroscopy," Science 354, 600 (2016).

[21] Q. Li, T. C. Briles, D. A. Westly, T. E. Drake, J. R. Stone, B. R. Ilic, S. A. Diddams, S. B. Papp, and K. Srinivasan, "Stably accessing octave-spanning microresonator frequency combs in the soliton regime," Optica 4, 193-203 (2017).

[22] P. Marin-Palomo, J. N. Kemal, M. Karpov, A. Kordts, J. Pfeifle, M. H. P. Pfeiffer, P. Trocha, S. Wolf, V. Brasch, M. H. Anderson, R. Rosenberger, K. Vijayan, W. Freude, T. J. Kippenberg, and C. Koos, "Microresonator-based solitons for massively parallel coherent optical communications," Nature 546, 274-279 (2017).

[23] D. C. Cole, E. S. Lamb, P. Del'Haye, S. A. Diddams, and S. B. Papp, "Soliton crystals in Kerr resonators," Nature Photon. 11, 671-676 (2017).

[24] H. Guo, E. Lucas, M. H. P. Pfeiffer, M. Karpov, M. Anderson, J. Liu, M. Geiselmann, J. D. Jost, and T. J. Kippenberg, "Intermode Breather Solitons in Optical Microresonators," Phys. Rev. X 7, 041055 (2017).

[25] M.-G. Suh and K. J. Vahala, "Soliton microcomb range measurement," Science 359, 884 (2018).

[26] P. Trocha, M. Karpov, D. Ganin, M. H. P. Pfeiffer, A. Kordts, S. Wolf, J. Krockenberger, P. Marin-Palomo, C. Weimann, S. Randel, W. Freude, T. J. Kippenberg, and C. Koos, "Ultrafast optical ranging using microresonator soliton frequency combs," Science 359, 887 (2018).

[27] A. Dutt, C. Joshi, X. Ji, J. Cardenas, Y. Okawachi, K. Luke, A. L. Gaeta, and M. Lipson, "On-chip dual-comb source for spectroscopy," Sci. Adv. 4, e1701858 (2018).

[28] D. T. Spencer, T. Drake, T. C. Briles, J. Stone, L. C. Sinclair, C. Fredrick, Q. Li, D. Westly, B. Robert Ilic, A. Bluestone, N. Volet, T. Komljenovic, L. Chang, S. H. Lee, D. Y. Oh, M.-G. Suh, K. Y. Yang, M. H. P. Pfeiffer, T. J. Kippenberg, E. Norberg, L. Theogarajan, K. Vahala, N. R. Newbury, K. Srinivasan, J. E. Bowers, S. A. Diddams, and S. B. Papp, "An optical-frequency synthesizer using integrated photonics," Nature 557, 81-85 (2018).

[29] T. J. Kippenberg, A. L. Gaeta, M. Lipson, and M. L. Gorodetsky, "Dissipative Kerr solitons in optical microresonators," Science 361, eaan8083 (2018).

[30] S. Coen and M. Erkintalo, "Universal scaling laws of Kerr frequency combs," Opt. Lett. 38, 1790 (2013).

[31] T. Carmon, L. Yang, and K. J. Vahala, "Dynamical thermal behavior and thermal self-stability of microcavities," Opt. Express 12, 4742 (2004).

[32] H. Guo, M. Karpov, E. Lucas, A. Kordts, M. H. P. Pfeiffer, V. Brasch, G. Lihachev, V. E. Lobanov, M. L. Gorodetsky, and T. J. Kippenberg, "Universal dynamics and deterministic switching of dissipative Kerr solitons in optical microresonators," Nature Phys. 13, 94-102 (2017).

What is claimed is:

1. A mode locking soliton device comprising:
   a first optical port to accept an input coherent light;
   a second optical port to provide an output comb of a plurality of wavelengths; and
   a comb resonator with optical Kerr nonlinearity and anomalous group-velocity dispersion optically coupled to both of said first optical port and said second optical port, said resonator comprising an optical property of a negative nonlinear bistability.

2. The mode locking soliton device of claim 1, wherein in response to said input coherent light, said output comb of said plurality of wavelengths is self-starting.

3. The mode locking soliton device of claim 1, wherein said mode locking soliton device comprises a self-starting mode locking soliton microcomb device.

4. The mode locking soliton device of claim 1, wherein said resonator comprises a ring resonator.

5. The mode locking soliton device of claim 4, wherein said ring resonator is coupled to length of an optical waveguide, and either end of said optical waveguide provides said first optical port and said second optical port.

6. The mode locking soliton device of claim 1, wherein said input coherent light comprises a laser light.

7. The mode locking soliton device of claim 1, wherein said resonator comprises a planar resonator of an integrated optical structure.

8. The mode locking soliton device of claim 1, wherein said resonator comprises a z-cut lithium niobate (LN) resonator.

9. The mode locking soliton device of claim 1, wherein said resonator comprises a material selected from: lithium niobate (LiNbO3), lithium tantalate (LiTaO3), potassium niobate (KNbO3), gallium arsenide (GaAs), or indium phosphide (InP).

10. The mode locking soliton device of claim 1, wherein said resonator comprises a material selected from: BBO, LBO, LYF, or CaF2.

11. The mode locking soliton device of claim 1, wherein said optical property of said negative nonlinear bistability is based on a pyroelectric and electro-optic effect property of a material.

12. The mode locking soliton device of claim 1, wherein said optical property of said negative nonlinear bistability is based on a negative thermo-optic coefficient property of a material.

13. The mode locking soliton device of claim 1, wherein said optical property of said negative nonlinear bistability is based on a negative thermal expansion coefficient property of a material.

14. The mode locking soliton device of claim 1, wherein said optical property of said negative nonlinear bistability is based on a combination of at least two optical properties of materials selected from: pyroelectric and electro-optic effect, negative thermo-optic coefficient, and negative thermal expansion coefficient.

15. The mode locking soliton device of claim 1, wherein said optical property of said negative nonlinear bistability is based on a type of material wafer cut.

16. A method of producing a comb of a plurality of wavelengths comprising:
- providing a mode locking soliton device comprising a first optical port, a second optical port, and a comb resonator with optical Kerr nonlinearity and anomalous group-velocity dispersion optically coupled to both of said first optical port and said second optical port, said resonator comprising an optical property of a negative nonlinear bistability;
- illuminating said first optical port by a source of coherent light to self-start mode locking of said resonator; and
- generating a coherent output comb of said plurality of wavelengths as output light from said second optical port.

17. The method of claim 16, wherein said step of illuminating comprises illuminating said first optical port by said source of coherent light to self-start mode locking of said resonator in a single-soliton state.

18. The method of claim 16, wherein said step of illuminating comprises illuminating said first optical port by said source of coherent light to self-start mode locking of said resonator in a multi-soliton or a soliton-crystal state.

\* \* \* \* \*